US007634787B1

(12) United States Patent
Gebhardt et al.

(10) Patent No.: US 7,634,787 B1
(45) Date of Patent: Dec. 15, 2009

(54) AUTOMATIC CONTROL OF BROADCAST AND EXECUTION OF INTERACTIVE APPLICATIONS TO MAINTAIN SYNCHRONOUS OPERATION WITH BROADCAST PROGRAMS

(75) Inventors: Bryan C. Gebhardt, Oakland, CA (US); Kalpesh R. Patel, San Jose, CA (US); Allan C. Thygesen, Menlo Park, CA (US); Steve Berriatua, San Bruno, CA (US); Christopher J. Michel, Burbank, CA (US)

(73) Assignee: Wink Communications, Inc., San Francisco, CA (US)

( * ) Notice: Subject to any disclaimer, the term of this patent is extended or adjusted under 35 U.S.C. 154(b) by 0 days.

(21) Appl. No.: 09/333,724

(22) Filed: Jun. 15, 1999

(51) Int. Cl.
*H04N 7/10* (2006.01)
*H04N 7/025* (2006.01)

(52) U.S. Cl. .............................. 725/36; 725/32; 725/34; 725/35; 725/24; 725/25; 725/27; 725/28; 725/91; 725/93; 725/103; 725/114; 725/116; 725/138; 725/144; 725/146; 709/217; 709/202; 709/248

(58) Field of Classification Search ................... 725/24, 725/25, 27, 28, 32, 36, 91, 93, 103, 114, 725/116, 138, 144, 146, 34, 35; 709/217, 709/202, 248
See application file for complete search history.

(56) References Cited

U.S. PATENT DOCUMENTS

| 4,751,578 | A | 6/1988 | Reiter et al. ................. 358/183 |
| 5,307,173 | A | 4/1994 | Yuen et al. .................... 358/335 |
| 5,334,975 | A | 8/1994 | Wachob et al. .............. 340/825 |

(Continued)

FOREIGN PATENT DOCUMENTS

EP 0 942 595 A2 3/1999

OTHER PUBLICATIONS

*Advanced Television Enhancement Forum Specification (ATVEF)*, Version 1.1r26, Feb. 2, 1999, pp. 1-37.

(Continued)

*Primary Examiner*—Jason P Salce
(74) *Attorney, Agent, or Firm*—Schwegman, Lundberg & Woessner, P.A.

(57) ABSTRACT

An automation server interfaces with broadcast scheduling systems of various types to automatically synchronize the behavior of interactive applications relative to various broadcast programs, such as television shows and commercials, so as to maintain the appropriate interactive application for whatever broadcast program is airing. This allows for television shows which have an associated interactive application, but which are segmented by commercials (which may have their own interactive applications) to have their interactive application displayed while the television show in on, but not during commercials, while maintaining any state information that has been created during execution of the interactive application. The automation server includes multiple channel interfaces, each having a translator and an event manager. The translator translates native control signals from the scheduling system into a fixed set of atomic commands which represent the lifecycle behavior of a broadcast program. The event manager receives these atomic commands and uses them to determine the appropriate state for any interactive application that is associated with the broadcast program. The event manager transmits commands to a broadcast server which directly manages the interactive applications by transmitting code, data, and commands to broadcast receivers that controls the execution of the interactive applications in response to the event manager's commands.

20 Claims, 11 Drawing Sheets

U.S. PATENT DOCUMENTS

| | | | |
|---|---|---|---|
| 5,343,239 A | 8/1994 | Lappington et al. | 348/12 |
| 5,400,402 A | 3/1995 | Garfinkle | 380/20 |
| 5,448,568 A * | 9/1995 | Delpuch et al. | 348/423.1 |
| 5,504,896 A | 4/1996 | Schell et al. | 395/650 |
| 5,539,920 A | 7/1996 | Menand et al. | 455/5.1 |
| 5,557,317 A | 9/1996 | Nishio et al. | 348/7 |
| 5,559,550 A | 9/1996 | Mankovitz | |
| 5,563,648 A | 10/1996 | Menand et al. | 348/13 |
| 5,583,563 A | 12/1996 | Wanderscheid et al. | 348/13 |
| 5,585,858 A | 12/1996 | Harper et al. | 348/485 |
| 5,586,264 A | 12/1996 | Belknap et al. | 395/200.08 |
| 5,648,824 A * | 7/1997 | Dunn et al. | 725/88 |
| 5,652,615 A | 7/1997 | Bryant et al. | 348/9 |
| 5,657,072 A | 8/1997 | Aristides et al. | |
| 5,675,373 A | 10/1997 | Joiner et al. | 348/13 |
| 5,689,799 A | 11/1997 | Dougherty et al. | 455/2 |
| 5,719,618 A | 2/1998 | Park | |
| 5,721,829 A * | 2/1998 | Dunn et al. | 725/87 |
| 5,729,279 A | 3/1998 | Fuller | 348/384 |
| 5,734,413 A | 3/1998 | Lappington et al. | |
| 5,768,539 A | 6/1998 | Metz et al. | |
| 5,774,664 A | 6/1998 | Hidary et al. | |
| 5,781,228 A | 7/1998 | Sposato | 348/13 |
| 5,790,198 A | 8/1998 | Roop et al. | |
| 5,818,440 A | 10/1998 | Allibhoy et al. | 345/327 |
| 5,818,441 A | 10/1998 | Throckmorton et al. | |
| 5,819,034 A | 10/1998 | Joseph et al. | 395/200.31 |
| 5,826,166 A | 10/1998 | Brooks et al. | 455/5.1 |
| 5,828,370 A * | 10/1998 | Moeller et al. | 715/720 |
| 5,835,717 A | 11/1998 | Karlton et al. | 395/200.47 |
| 5,848,352 A | 12/1998 | Dougherty et al. | 455/5.1 |
| 5,850,447 A | 12/1998 | Peyret | |
| 5,861,881 A | 1/1999 | Freeman et al. | |
| 5,872,589 A | 2/1999 | Morales | |
| 5,880,720 A | 3/1999 | Iwafune et al. | 345/327 |
| 5,931,908 A | 8/1999 | Gerba et al. | |
| 5,937,331 A * | 8/1999 | Kalluri et al. | 725/146 |
| 5,970,206 A | 10/1999 | Yuen et al. | |
| 5,974,222 A | 10/1999 | Yuen et al. | |
| 6,002,393 A | 12/1999 | Hite et al. | |
| 6,006,256 A * | 12/1999 | Zdepski et al. | 725/114 |
| 6,008,802 A | 12/1999 | Iki et al. | |
| 6,018,768 A | 1/2000 | Ullman et al. | 709/218 |
| 6,021,433 A | 2/2000 | Payne et al. | |
| 6,055,560 A * | 4/2000 | Mills et al. | 709/200 |
| 6,061,719 A | 5/2000 | Bendinelli et al. | 709/218 |
| 6,064,438 A | 5/2000 | Miller | |
| 6,064,794 A * | 5/2000 | McLaren et al. | 386/68 |
| 6,067,107 A * | 5/2000 | Travaille et al. | 725/24 |
| 6,070,186 A * | 5/2000 | Nishio | 725/92 |
| 6,160,989 A * | 12/2000 | Hendricks et al. | 725/36 |
| 6,181,335 B1 | 1/2001 | Hendricks et al. | |
| 6,256,785 B1 | 7/2001 | Klappert et al. | |
| 6,295,647 B1 | 9/2001 | Ramaswamy | 725/116 |
| 6,415,438 B1 * | 7/2002 | Blackketter et al. | 725/136 |
| 6,460,180 B1 | 10/2002 | Park et al. | |
| 6,487,721 B1 | 11/2002 | Safadi | |
| 6,530,082 B1 * | 3/2003 | Del Sesto et al. | 725/9 |
| 6,530,084 B1 * | 3/2003 | Del Sesto et al. | 725/61 |
| 6,615,408 B1 | 9/2003 | Kaiser et al. | |
| 6,725,461 B1 * | 4/2004 | Dougherty et al. | 725/40 |
| 6,799,328 B1 * | 9/2004 | Freimann et al. | 725/44 |
| 7,051,357 B2 | 5/2006 | Carr | |

OTHER PUBLICATIONS

Pending United States patent application, "Automated Retirement of Interactive Applications Using Retirement Instructions for Events and Program States," U.S. Appl. No. 09/334,131, filing date Jun. 15, 1999.

Statement from first named inventor concerning Cited Reference G.

Wink Communications, Technical Specification, Subject: 5.2.17 ServerInfo Define, Dec. 31, 1995.

Evain, J.P. The Multimedia Home Platform—an overview, EBU Technical Department Review—Spring 1998.

"3.3.5 Information Carried in the Vertical Blanking Interval", *Modern Cable Television Technology*, Morgan Kauffman Publishers 3.3 Digital Video Compression,(1999),101.

Gibilisco, Stan, *The Illustrated Dictionary of Electronics, 7th ed.*, McGraw-Hill Companies, Inc.,(1997),p. 601.

Adya, Atul, et al., "FARSITE: Federated, Available, and Reliable Storage for an Incompletely Trusted Environment", *5th Symposium on Operating Systems Design and Implementation*, (Dec. 2002), 1-14.

Anderson, Ross J., et al., "The Eternity Service", *Proceedings of the 1st International Conference on the Theory and Applications of Cryptology (PRAGOCRYPT '96)*, Prague, Czech Republic,(1996),1-11.

Back, Adam, "Eternity Service", *Phrack Magazine*, 7(51), http://www.cypherspace.org/adam/eternity/,(Sep. 1, 1997),14 p.

Batten, Christopher, et al., "pStore: A Secure Peer-to-Peer Backup System", *Technical Memo MIT-LCS-TM-532, MIT Laboratory for Computer Science.*, (Dec. 2001),1-12.

Cooper, Brian, et al., "Creating Trading Networks of Digital Archives", *Proceedings of the 1st ACM/IEEE-CS joint conference on Digital libraries*, (2001),353-362.

Cooper, Brian, et al., "Implementing a Reliable Digital Object Archive", *Proceedings of the Fourth European Conference on Research and Development in Digital Libraries (ECDL)*, (2000),1-11.

Cooper, Brian, et al., "Implementing a Reliable Digital Object Archive (Extended Version)", *Stanford University Technical Report*, (2000),1-13.

Cooper, Brian, et al., "InfoMonitor: Unobtrusively archiving a World Wide Web server", *Stanford University Technical Report*, (2000),1-22.

Cooper, Brian F., et al., "Peer-to-peer data trading to preserve information", *ACM Transactions on Information Systems (TOIS)*, 20(2), (2002),133-170.

Cooper, Brian, et al., "Protecting the PIPE from malicious peers", *Stanford University Technical Report*, (2002),1-10.

Crespo, Arturo, et al., "Cost-driven Design for Archival Repositories", *Proceedings of the 1st ACM/IEEE-CS joint conference on Digital libraries*, (2001),363-372.

Crespo, Arturo, et al., "Modeling Archival Repositories for Digital Libraries", *Proceedings of the 4th European Conference on Research and Advanced Technology for Digital Libraries, Lecture Notes In Computer Science*; vol. 1923, (2000),190-205.

Gladney, H. M., et al., "Trustworthy 100-Year Digital Objects: Durable Encoding for When It's Too Late to Ask", http://eprints.erpanet.org/archive/00000007/01/TDO_Durable_final_submission.pdf, Revised Oct. 20, 2004,(Jun. 30, 2003),1-20.

Goldberg, Andrew V., et al., "Towards an Archival Intermemory", *Proceedings of the Advances in Digital Libraries Conference, ADL '98*, (Apr. 22-24, 1998),1-10.

Kamin, Todd, "The Free Haven User Interface: Methods for Inserting and Retrieving Information Stored in Free Haven", *6.199 AUP Final Report*, (May 21, 2000),1-15.

Kubiatowicz, John, et al., "OceanStore: An Architecture for Global-Scale Persistent Storage", *Proceedings of the Ninth International Conference on Architectural Support for Programming Languages and Operating Systems (ASPLOS 2000)*, (Nov. 2000),1-12.

Maniatis, Petros, "Historic Integrity in Distributed Systems", *Ph.D. Thesis*, Stanford University, (Aug. 2003),1-140.

Rosenthal, David S., et al., "Permanent Web Publishing", *Proceedings of the USENIX Annual Technical Conference, Freenix Track (Freenix 2000)*, (Jun. 2000),129-140.

Tukovinit, Komkit, "Storage-Replication Service in Library 2000", *6.199 Advanced Undergraduate Project*, (Sep. 13, 1994),1-27.

Weatherspoon, Hakim, et al., "Naming and Integrity: Self-Verifying Data in Peer-to-Peer Systems", *Proceedings of the International Workshop on Future Directions in Distributed Computing (FuDiCo 2002)*, (2002),1-4.

Weatherspoon, Hakim, et al., "Silverback: A Global-Scale Archival System", *Technical Report: CSD-01-1139*, University of California, Berkeley, California,(Mar. 2001),1-17.

Wong, Theodore M., et al., "Verifiable Secret Redistribution for Archive Systems", *Proceedings of the First International IEEE Security in Storage Workshop.*, (Dec. 2002),1-12.

U.S. Appl. No. 09/754,650 Non-Final Office Action mailed Dec. 13, 2007, 33 Pgs.

"U.S. Appl. No. 09/754,650 Response to Non-Final Office Action filed Apr. 10, 2008", 33 pgs.

"U.S. Appl. No. 09/754,650 Final Office Action mailed Jun. 24, 2008", FOAR, 33 pgs.

"U.S. Appl. No. 09/754,650, Response filed Nov. 10, 2008 to Final Office Action mailed Jun. 24, 2008", 23 pgs.

"U.S. Appl. No. 09/754,650, Appeal Brief filed Mar. 10, 2009", 40 pgs.

*Advanced Television Enhancement Forum Specification (ATVEF)*, Version 1.1r26, Feb. 2, 1999, pp. 1-37.

Pending United States patent application, "Automated Retirement of Interactive Applications Using Retirement Instructions for Events and Program States," U.S. Appl. No. 09/334,131, Filing date Jun. 15, 1999.

Wink Communications, Technical Specification, Subject: 5.2.17 ServerInfo Define, Dec. 31, 1995.

\* cited by examiner

C: Commercial Event
S: Show Event
D: Default Event

AUTOMATIC CONTROL OF BROADCAST AND EXECUTION OF INTERACTIVE APPLICATIONS TO MAINTAIN SYNCHRONOUS OPERATION WITH BROADCAST PROGRAMS

BACKGROUND

A. Technical Field

The present invention relates generally to the field of interactive television, and more particularly, to the automatic control of interactivity in synchrony with television broadcast programs.

B. Background of the Invention

Most interactive television systems attempt to augment existing broadcast programs with viewer selectable interactivity. For example, the interactivity may be broadcast on a special interactive channel that viewer can tune a set top box or other device to receive and present the interactivity. This interactivity is typically provided with a user interface that occupies the entire television screen. In this fashion, the viewer chooses either to watch conventional broadcast programs on the regular channels, or to use the interactivity on an interactive channel. In other implementations, the interactivity may be activated on any channel, but still takes up the entire television screen. However, these implementations of interactive television typically do not require the interactivity to be synchronous with some broadcast program that is being broadcast, since the interactivity overrides the entire screen, thus blocking presentation of the broadcast program. Broadcast programs include television shows, commercials, programming guides, and like.

Another version of interactive television is intended to be displayed only a portion of the television screen, and to provide interactivity that accompanies a broadcast program. For example, a broadcast game show may be accompanied by interactivity that allows the viewer to play along and input answers to questions being posed during the show. This interactivity is displayed on only a portion of the television screen, so as to allow the viewer to continue to watch the broadcast program.

For interactivity that accompanies a broadcast program, it is desirable to maintain the interactivity in synchrony with the broadcast program. This means that the interactivity should be available to the viewer whenever the broadcast program that it accompanies is being broadcast, and that any state information that the viewer has created, e.g. an accumulated point total in a game, should be maintained, even if the broadcast program is temporarily suspended and then resumed, for example, during a commercial break.

It further means that the interactivity should not be displayed when the accompanying broadcast program is not being broadcast or is otherwise interrupted. In particular, proper synchrony requires that the interactivity for a television show not be displayed when a commercial is broadcast during the show. This is for two reasons. First, the commercial may have its own interactivity accompanying it, such as a form for the user to request product information about a product advertised during the commercial. Thus, the commercial's interactivity must be displayed, and yet the show's interactivity must be re-displayed when the commercial (or series of commercials) is over and the television show is resumed. Redisplay of the show's interactivity should be prompt and as noted, should preserve the state information that was available when the commercial began. For example, if the viewer was accumulating points in an interactive game, then the accumulated points should be available when the show's interactivity is resumed.

Second, even if the commercial(s) does not have its own interactivity, it is inappropriate to display the interactivity of the show during the commercial. This is because the interactivity will override a portion of the television screen, thereby covering up part of the commercial, which is unacceptable to the advertiser that paid for the commercial to be broadcast. Also, the interactivity for the show is not associated with the commercial, and its appearance may confuse the viewer.

Accordingly, it is desirable to provide an interactive television system, method, and software products that correctly synchronize the interactivity of various broadcast programs, and accommodate the interruption of broadcast programs by other broadcast programs.

Apart from interactive television systems, conventional television broadcast systems provide various degrees of automated and manual control over how the broadcast programs are selected and output for broadcast transmission. A conventional broadcast system typically includes a broadcast scheduling system, various broadcast sources, a data insertion unit, and a transmitter. The broadcast sources provide the video, audio, or other content that is broadcast via the transmitter. These broadcast sources may be various types of video and audio tape decks, video tape libraries, digital audio/video sources, live video sources, server computers, and the like.

The scheduling system generally controls broadcast sources in a broadcast system with sequences of native control signals. These control signals instruct various ones of the broadcast sources to start, stop, load or otherwise manage their broadcast programs. The sequence of control signals is determined mainly by a playlist that identifies which broadcast source to activate or deactivate at which times, and the channel assignments to which an active broadcast source is to be routed. In a manual control system, the control signals are generated in response to manual operations of human operators to selectively activate or deactivate any of the broadcast sources, and assign the output to the appropriate channel.

The broadcast data from the broadcast source is passed to the transmitter. The transmitter transmits the broadcast signal on a selected channel to any number of broadcast receivers. A broadcast receiver, such as a set top box or compatible television, tuned to the selected channel receives the broadcast signal and displays a broadcast program.

Conventional scheduling systems and manual controls generally provide their output control signals only to the broadcast sources or similar devices. This is because these control signals are in a format specific to the broadcast sources, and not designed to control other types of broadcast equipment. For example, scheduling systems that control video sources use control signals that are meaningful to the video source devices. Accordingly, it is desirable to provide a system and method that uses existing control signals from scheduling systems to further facilitate the automated control of synchronous interactivity with broadcast programs. This is desirable to avoid requiring modification of the scheduling system to operate with new automation enabled equipment.

Some broadcasts insert into the broadcast signal codes that identify the broadcast program or its type, for example, as a television show or as a commercial. One commonly used sets of codes are the Industry Standard Coding Identification system ("ISCI codes") of the American Association of Advertising Agencies Inc. ISCI codes are normally used to indicate sponsorship or affiliation of a commercial broadcast. However, these codes are not currently used to control the execution of interactivity that may be associated with a television show, commercial, or other broadcast program. Accordingly, it is desirable to a provide a system and method that uses these and similar embedded codes in the broadcast signal to control the synchronization of the interactivity of various broadcast programs.

One system of interactive television cooperates with the conventional broadcast system, such as described above, to provide useful interactivity. Such a system includes a broadcast server that stores a database of interactive applications. The interactive applications are selectively associated with various broadcast programs, in order to accompany such programs as they are being broadcast. The broadcast server typically receives its own playlist for a given broadcast period, and uses scheduling information therein to identify particular broadcast programs being currently broadcast. The broadcast server retrieves the interactive application(s) associated with the currently broadcast program(s), and provides these interactive applications to a data insertion unit. The data insertion unit combines the data from the interactive applications with the broadcast data from the broadcast sources to create the broadcast signal, in which the broadcast program is now accompanied by its interactive application. The combined broadcast signal is transmitted by the transmitter on a selected channel. Any of the broadcast receivers tuned to the channel receive the broadcast signal containing both the broadcast program and the accompanying interactive application. The broadcast receiver displays the broadcast program, and decodes and executes the interactive application, displaying it as appropriate on the television screen. The broadcaster server is further capable of sending commands to the broadcast receiver to selectively start, stop, suspend, or resume the execution of some interactive application in accordance with predefined instructions in the playlist.

However, the broadcaster server has previously not been integrated with existing scheduling systems to automate the control of interactive applications based on control signals from the scheduling system. One of difficulties in this regard is the lack of uniformity, and the variety, of control signals that various types of scheduling systems use to control their broadcast sources, which as noted above, are designed to interface with broadcast sources. Nor has this system previously been responsive to ISCI codes or the like to control interactivity. Accordingly it is desirable to provide synchronous interactive applications through an effective interface between the scheduling systems and the broadcast server.

SUMMARY OF THE INVENTION

The present invention provides for automated control of interactivity to maintain synchronous display of interactivity with their respective broadcast programs, regardless of the interruption of a broadcast program and its interactivity by other broadcast programs and/or interactivity.

In accordance with one embodiment of the present invention, control signals that normally are used only to control the broadcast sources (or similar devices such as subtitlers), are received and processed to output commands to a broadcast server. These commands selectively instruct the broadcast server to control the execution of interactivity on a broadcast receiver. The broadcast server in turn transmits commands to the broadcast receiver, which executes the commands to control the interactivity.

The control signals used by the present invention may come from a variety of sources, such as from a conventional broadcast scheduling system operating in automatic or manual modes, or from pre-recorded sources that encode the signals in conjunction with the broadcast programs, as on video tape.

As noted above, the control signals are typically formatted specifically to control the broadcast sources, such as specific types of video, audio, or other output devices. In addition, the control signals merely control the broadcast of these sources, and have no direct or inherent relationship to the execution of the interactivity. Accordingly, the present invention translates the control signals into commands that are acceptable to the broadcast server to selectively control the execution of the interactivity.

The present invention may also use state information from the broadcast server to determine the current state of execution of an interactivity on various ones of the broadcast receivers; this state information allows for different commands to be generated in response to the otherwise opaque control signals from the scheduling system.

The present invention provides for automated synchronous control of interactivity for a variety of different types of broadcast scheduling systems. In general, the various types of scheduling systems provide different amounts and types of information in their control signals.

Certain basic scheduling systems merely provide a control signal indicating to start, stop, or prepare a broadcast program, which signal may sometimes include a broadcast program ID for the program. For this type of scheduling system, identification of the broadcast program (e.g. a television show or a commercial) is used to determine if there is an accompanying interactive application for the broadcast program; timing information is used to determine if the interactive application should be started, stopped, suspended, or resumed. Appropriate commands and data are provided to the broadcast server to selectively control broadcast of the interactive application.

Another type of scheduling system provides control signals that can be used to identify the commercial programs that are being broadcast during a television show, but otherwise does not identify the television programs themselves. The present invention uses this information to identify the interactivity associated with the commercial, and thus, to provide commands to the broadcast server to effect the broadcast of the identified interactivity, along with commands to selectively suspend and resume interactivity that may be accompanying the television show in which the commercial aired.

Yet another type of scheduling system provides control signals which identify the broadcast program along with its duration. In this case, the present invention is capable of selectively suspending and resuming the appropriate interactivity for a broadcast program and intervening commercials.

In one embodiment, the present invention provides an automation server that interfaces between existing, conventional broadcast scheduling systems and a server of interactive applications (and other forms of interactivity), to selectively control the execution of the interactivity that may accompany broadcast programs in response to control signals output by the scheduling system.

In accordance with the present invention, the automation server further interfaces with the broadcast server to provide commands to the broadcast server to selectively start, cancel, suspend, or resume execution of an interactive application. Using the control signals from the scheduling system, the automation server determines which broadcast programs are being broadcast, and creates and maintains state information about the state of each broadcast program. Using information identifying the broadcast programs and their associated interactivity (if any), the automation server also maintains state information about the state of each interactive application. Using this state information and the control signals from the scheduling system, the automation server determines the appropriate commands to send to the broadcast server to maintain synchrony between the broadcast programs and the interactive applications.

This synchronous behavior results in an interactivity being displayed at the times that its associated broadcast program is displayed, and not shown during other times. For example, the present invention provides the proper synchronous display of interactive applications for television shows which are segmented by one or more commercial breaks (each of which may have multiple commercials, and which commercials may have their own interactivity). The present invention detects when a commercial break has occurred during the broadcast or a television show from the control signals of the scheduling system. The present invention may then suspends (stops) execution of the interactivity of the television program, without canceling the interactivity until such time as it can be safely determined that there are no further segments of the same television show after the commercial break has ended. During the commercial break, the appropriate interactivity for the commercial(s) is executed. If the television show is resumed, that is another segment of the television show is aired, the present invention detects that the prior segment and the current segment are related, and restarts the suspended interactivity, restoring any state information (e.g., current game points, form data, etc.) that may have been created before the commercial break. If the television show is not resumed after the commercial break and a new television show is broadcast, again the present invention detects this change in broadcast program, and terminates the interactivity for the prior television show and starts the interactivity for the next television show.

In one embodiment of the present invention, the automation server includes a plurality of channel interfaces, each of which receives and manages the control signals for a specific channel. Each channel interface includes a translator module and an event manager. The translator module translates the native control signals from the scheduling system pertaining to broadcast programs on the channel into a fixed set of atomic commands. The translator also maintains state information about the lifecycle of each broadcast program. The event manager receives the atomic commands and processes them into commands to the broadcast server to control the interactivity of the broadcast programs. The event manager maintains state information about the lifecycle of interactive applications on the channel, and from this state information, generates the appropriate commands to the broadcast server. The use of a separate translator and event manager allows the present invention to easily interface with different scheduling system by use of different translators, while preserving the same event manager. In addition, the separation of the translator module and the event manager enables the automation server to potentially interface with different types of broadcast servers by creating new types of event managers, without requiring changes to the translator module. This feature allows the automation server to cooperate with interactivity defined in various standards that may be developed in the future.

In the context of the present invention, interactivity may be provided by any form of interactive application, such as those that are transmitted in the same signal as the broadcast programs and executed by the broadcast receiver or other end-user device that receives the broadcast signal, or interactive applications executed at a cable head end or other broadcast source, interactive applications executing on a conventional computer and broadcast over the Internet or other networks in synchrony with broadcast programs, or that are provided asynchronously from the broadcast program and executed as needed.

The automation server of the present invention may be embodied as a software product, or as a part of a larger system or apparatuses including special purpose hardware and software. The present invention may also be practiced as various methods of controlling the execution of interactivity associated with broadcast programs.

DETAILED DESCRIPTION OF THE PREFERRED EMBODIMENTS

Figure 1:
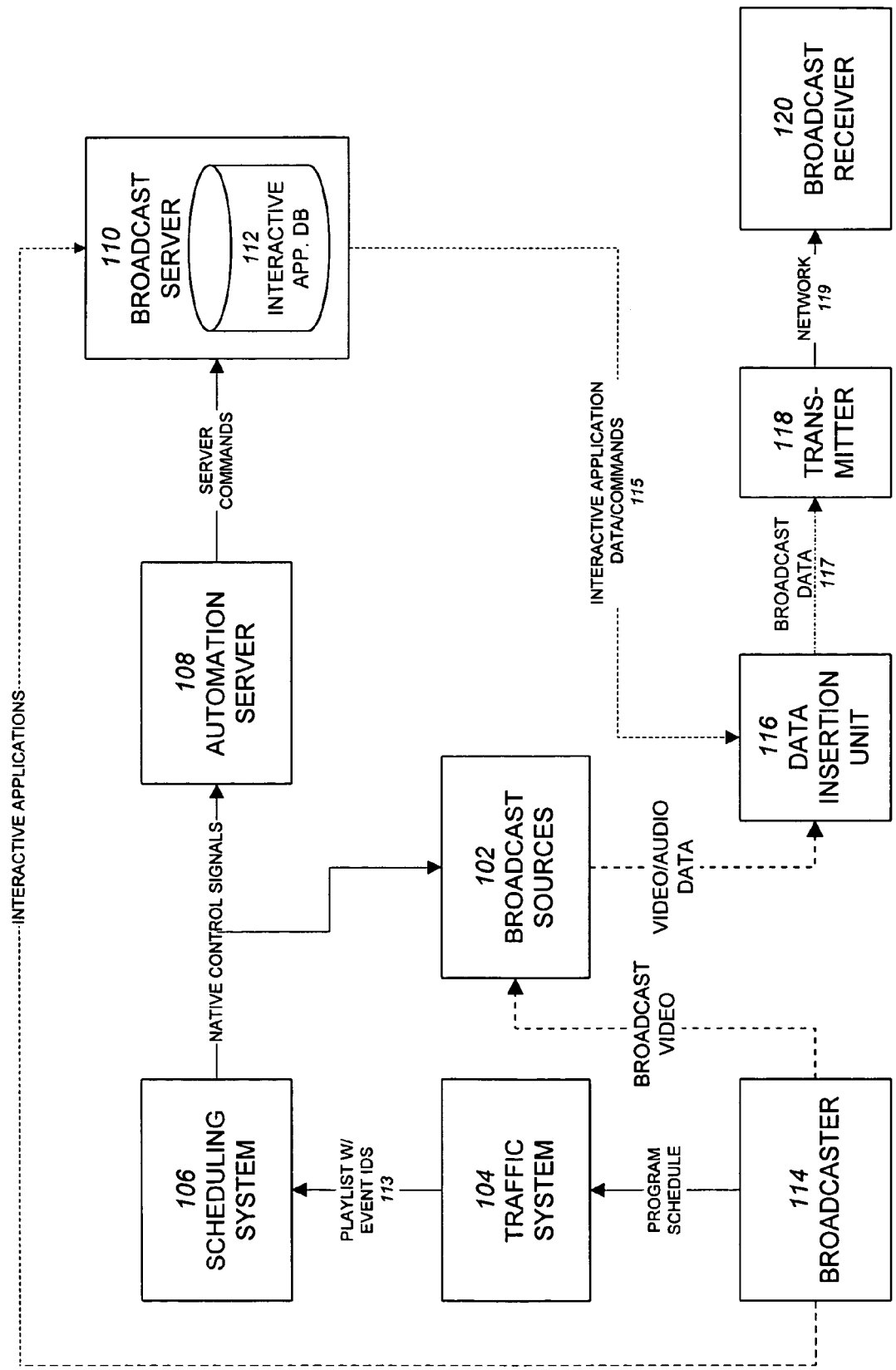
FIG. 1 is an illustration of a system in accordance with the present invention.

Referring now to FIG. 1, there is shown an illustration of a system in accordance with the present invention. It will be appreciated that the system illustrated in FIG. 1 may be incorporated in to larger, more complex systems while still providing the features and benefits of the invention.

A. System Overview

Generally, system 100 includes a scheduling system 106, an automation server 108, a broadcast server 110, a traffic system 104, broadcast program sources 102, a data insertion unit 116, and a transmitter 118. These elements are typically used in an embodiment used by a cable operator at a cable head end. Implementation of the present invention in other installations is certainly feasible. Broadcast receivers (BR) 120 are remotely distributed in viewers' homes, offices, and the like. The person or persons receiving the programs are referred to as "subscribers" or "viewers."

The system 100 cooperates with multiple broadcasters 114. A broadcaster 114 provides program material to be broadcast to the BRs 120. As used herein, a "broadcaster" 114 is any entity providing a program that will be carried on a broadcast signal. A "program" is a discrete segment of a broadcast. Thus, as defined herein, programs include television shows, commercials, public service announcements, pay-per-view events, and the like. Broadcasters include television networks, as well as advertisers who prepare commercials, pay-per-view providers, cable networks, and the like.

A broadcaster 114 provides broadcast video data including as necessary audio and other data to various broadcast program sources 102, such as banks of video cassette players, video laserdisc players, subtitlers, video servers, character generators, audio cart machines, still stores, digital effects systems, live studio feeds, live remote field feeds (e.g. from cameras at a live sporting event), and the like that contain or generate program material. The broadcast video data is stored in the broadcast program sources 102 until needed for broadcast. Suitable broadcast program sources include the TCS45 Automated Video Library from Odetics, Inc. of Anaheim, Calif., and the MediaStream Server from Hewlett-Packard of Palo Alto, Calif., and similar devices or systems.

A traffic system 104 receives a program schedule from the broadcaster 114. The program schedule defines which programs provided by the broadcaster 114 are to be broadcast on which channels at which times. Depending on the broadcaster 114, commercial programs may be included in the program schedule, or slots in the schedule may be provided for insertion of commercials provided by other broadcasters 114. The traffic system 104 integrates the program schedules from the many different broadcasters, along with broadcast scheduling information that is locally generated, e.g., by the cable operator, to produce a playlist 113. A suitable traffic system 104 is the Columbine JDS from Columbine JDS Systems, Inc.

In one embodiment, this playlist 113 is prepared in advance of the broadcasts and identifies the programs that will be broadcast at particular times. Preferably the playlist 113 contains sufficient information to identify each program, its start and end times, the channel and network assignments. In addition, for each program at a particular time, there may be information identifying the particular broadcast program source 102 that is to output the program.

The scheduling system 106 may include manual or automated control components or both, and suitable switching apparatuses. The scheduling system 106 further receives the playlist 113 describing which broadcast programs are to be broadcast at which times, and using which the broadcast program sources 102. Via its manual and/or automated components, the scheduling system 106 couples the broadcast program sources to respective broadcast media for controlling which program sources output to which broadcast mediums at any given time. More particularly, the scheduling system 106 outputs native control signals which are formatted for, and typically meaningful only to, the various ones of the broadcast program sources 102. The types and complexity of the automated and manual components varies, and thus so do the types of control signals they provide. The manual component of the scheduling system 106 is used by an operator to manually select and activate the broadcast program sources 102 as needed, and generate the corresponding control signals which are likewise received by the automation server 108.

Yet another source of control signals to the automation server 108 includes pre-recorded control signals that are included with broadcast data on the broadcast sources 102. Thus, control signals appropriate to a particular broadcast program can be pre-generated and stored on a video tape of the broadcast program at the appropriate times. Storage of the control signals in this manner can be on any media which stores the broadcast programs. Alternatively, the control signals may be pre-recorded and stored on media separate from their broadcast programs, but played out in conjunction with them. Alternatively, the control signals may be embedded in real time into the broadcast data, for example using a VITC time code generator, or a NORPAK data insertion unit.

In addition, the methodology of obtaining the control signals may be done by either push from the scheduling system 106 or by polling the scheduling system 106.

The broadcast server 110 is preferably a computer system executing one or more software programs providing the functionality described herein. A suitable broadcast server is the Wink Broadcast Server, from Wink Communications, Inc. of Alameda, Calif. The broadcast server 110 contains an interactive application database 112. The interactive application database 112 stores interactive applications or other forms of interactivity that will be broadcast to various remotely distributed BRs 120. Interactive applications and other forms of interactive content may be added to the interactive applications database 112 by a broadcaster 114 or other program supplier and may be transmitted to the database 112 by a secure network link or other transmission media. Fields within the database 112 associate interactive applications with, for example, a particular broadcaster, network, channel, program, and/or broadcast time. In addition, each interactive application in the database 112 preferably has a unique interactive application identification code by which it may be identified. Association of the interactive application identification code with the program identification code (such as used by the broadcast sources), enables the broadcast server 112 to selectively retrieve an interactive application in response to receiving a program identification code. For ease of reference, the term "interactive application" covers all forms of interactivity for broadcast programs that are described herein or equivalent to those disclosed.

In one embodiment of the present invention, the interactive applications stored in the database 112 are described by a compact communications protocol. The compact protocol is designed to broadcast a compact set of information and commands among the system components in an efficient manner, thereby allowing the use of low bandwidth transports such as the vertical blanking interval ("VBI"). While a preferred embodiment of the present invention uses the compact protocol described herein, interactive applications may be described by other protocols, including for example, the Hypertext Markup Language ("HTML"), Extended Markup Language ("XML"), SUN MICROSYSTEMS INC.'s JAVA language, or the HTML-based interactive television protocol ATVEF. A detailed description of one compact protocol suitable for interactive applications, including supported definitions, scripts, and commands, is described in U.S. Pat. No. 5,689,799, entitled "Method and Apparatus for Routing Confidential Information," and is hereby incorporated by reference herein. The interactive applications are themselves software products comprising executable code and data, which configures and controls the operation of a broadcast receiver 120, as further described below.

There may be a plurality of broadcast servers 110, with each broadcast server 110 serving a particular geographic area, set of broadcasters, or set of subscribers. In one embodiment, each broadcast server 110 is identified by a unique server identification code.

Generally, the broadcast server 110 determines which interactive applications should be broadcast on a particular channel at a particular time, retrieves the interactive applications corresponding to the particular channel and time or program identification code from the database 112, and prepares the interactive applications for broadcast.

To determine which interactive applications are broadcast at the various times, channels, and so forth, the broadcast server 110 receives the playlist 113 of programs to be broadcast from the traffic system 104. The broadcast server 110 uses this information to identify and retrieve a corresponding interactive application (if any) from the database 112 that is to accompany each broadcast program. The broadcast server 110 further outputs commands, which are broadcast to the BRs 120 instructing to them start, stop, cancel, suspend, or resume interactive applications that may be received or already received and resident in memory in the BRs 120.

The broadcast server 110 formats a retrieved interactive application, if necessary, and otherwise prepares it for insertion into a broadcast signal. Using the playlist 113 received from the broadcaster 114, the broadcast server 110 passes the interactive application 115 and/or various commands, to the data insertion unit ("DIU") 116 to incorporate the interactive application 115 into the broadcast data 117 concurrent with the broadcast of the program.

The DIU 116 receives the interactive application 115 or commands from the broadcast server 110 and the broadcast signal, or feed, carrying the program corresponding to the interactive application 115. The broadcast feed may be received from the broadcast program sources, the broadcaster 114 directly, or, in the case where the broadcaster does not provide the feed, from a third party such as a network, cable operator, or local television station. The DIU 116 converts the interactive application 115 and commands into a format suitable for insertion into the broadcaster feed and transmission therewith as broadcast data 117. The DIU 116 may receive feeds from multiple broadcasters and can insert a separate interactive application into each feed. Likewise, the DIU 116 can simultaneously insert a separate interactive application into multiple channels from the same, or different, broadcasters 114.

The DIU 116 inserts the broadcast data 117 containing the interactive applications, commands, and broadcast programs into the broadcast medium. The broadcast medium is the frequency spectrum used to carry the interactive application 115. In one embodiment, the broadcast medium is a standard analog television signal following National Television Standards Committee ("NTSC") standards and the VBI is used as a transport to broadcast the interactive application. The transport is the specific portion of the broadcast medium which carries the interactive application 115. In another embodiment, the broadcast medium is a standard MPEG2 Digital Video Multiplex, containing one or more MPEG2 Video Services, and a MPEG2 elementary stream (or streams) within this multiplex is used as a transport. DUI 116 may operate with analog or digital video sources, and alternatively, may operate as an interface to a wide area network that connects the broadcaster 114 or broadcast sources 102 directly to various transmitters 118.

In one embodiment, the DIU 116 uses conventional methods to insert data defining an interactive application into the VBI of the broadcast feed. The North American Broadcast Teletext Standard (EIA-506), defines the methods and protocols for sending data in one or more lines of the VBI. However, a wide variety of other transport mechanisms are available, including those that broadcast the interactive application 115 separately from the television program. Such transport mechanisms include out-of-band transmitters, which transmit the interactive application 115 on an unused portion of the television frequency spectrum, and conventional frequency modulation ("FM") radio transmitters, which transmit the interactive application 115 outside the television frequency spectrum. In another embodiment, the DIU uses conventional methods to insert data into an elementary stream within a MPEG2 multiplex.

In one embodiment, error checking or error correcting codes such as Hamming codes are inserted with the data. In one embodiment, the DIU 116 translates the data into a Hamming code, and in another embodiment, the data received by the DIU 116 from the broadcast server 110 is already encoded.

The DIU 116 is coupled to a transmitter 118 for transmitting the broadcast feed, including any inserted interactive applications or commands from the broadcast server 110. In one embodiment, the transmitter 118 is a satellite uplink transmitting the feed to local uplink receivers which then distribute the feed to the BRs 120 via cable. In another embodiment, the transmitter 118 is a conventional cable system head-end amplifier. In yet other embodiments, the transmitter 118 is a conventional television broadcast transmitter or a high-definition television digital transmitter. Still in other embodiments, the transmitter 118 may transmit the broadcast data over a WAN connection, the Internet, or other public/private networks.

In another embodiment, the DIU 116 inserts the interactive application 115 into the program before the program is broadcast. For example, the DIU 116 may insert an interactive application into the source copy of a television commercial. Accordingly, the interactive application is broadcast whenever the commercial is broadcast. In this embodiment, the broadcast server 110 does not need to synchronize the retrieval of the interactive application with the schedule listed in the playlist. However, the automation server 108 will still be used to control synchronization of the operation of such a broadcast interactive application during broadcast of the commercial and of any interactive applications being broadcast during the television program in which the commercial is aired.

Regardless of transmission method and insertion time, the broadcast data 117, including the interactive application, is received by a subscriber's BR 120. Although only a single BR 120 is illustrated in FIG. 1, it is understood that in a typical embodiment there are hundreds or thousands of BRs 120 receiving the broadcast data 117 and responding as described herein. In a typical embodiment, the BR 120 is a television set-top box receiving the data 117 via a coaxial cable. Additionally, the BR 120 may be integrated into the television. Moreover, other broadcast receivers, including an NTSC broadcast receiver, a high-definition television digital receiver, a video cassette recorder, or an FM radio receiver can also be used.

The above architecture supports a number of useful embodiments, in which the automation server 108 controls broadcast server 110 to transmit various types and formats of data to achieve synchronous behavior with broadcast programs. First, it should be noted that the broadcast server 110 may also serve other types of data, separate from or in addition to interactive applications. For example, the broadcast server may serve data such as computer programs or audio/video data. The broadcast server may also provide data, forms, codes, or triggers to interactive applications previously transmitted to the broadcast receivers.

These various types of data may be transmitted in accordance with the present invention in response to commands from the automation server 108. For example, the broadcast server may send out an interactive application to a broadcast receiver well ahead of the time at which the interactive application and its associated broadcast program is to appear. Then in response to commands from the automation server 108, the broadcast server 110 may send out trigger codes which trigger the execution of the previously loaded interactive application so that it executes in synchrony with the broadcast program. Likewise, in response to the automation server 108, the broadcast server 110 may transmit forms or other data to update or modify the features, user interface, or functionality of an interactive application that is already resident at the broadcast receiver. This allows the automation server 108 to manipulate or change the interactive application in response to control signals from the scheduling system 106.

The broadcast server 110 may also serve hypermedia data, such as text, graphics, images, uniform resource locators (URLs), uniform resource identifiers (URIs), HTML, XML, ATVEF, JAVA applets, or other types or formats of data, again in response to commands from the automation server 108. For example, in response to the scheduling system 106 providing control signals indicating the start of a television show, the automation server 108 may instruct the broadcast server 110 to transmit a URL to a web site or page to the broadcast receiver, which in turn loads the web site for display to the user, for synchronous display of the web site with the television show.

For any of these or other types of data which may be served by the broadcast server 110 in response to commands from the automation server 108, the interactive application database or its analogue stores the data in association with program identifiers for the broadcast programs. This allows the automation server 108 to determine the appropriate data to be served given the program identifier from the control signals of the scheduling system 106.

B. Broadcast Receiver

Figure 2:
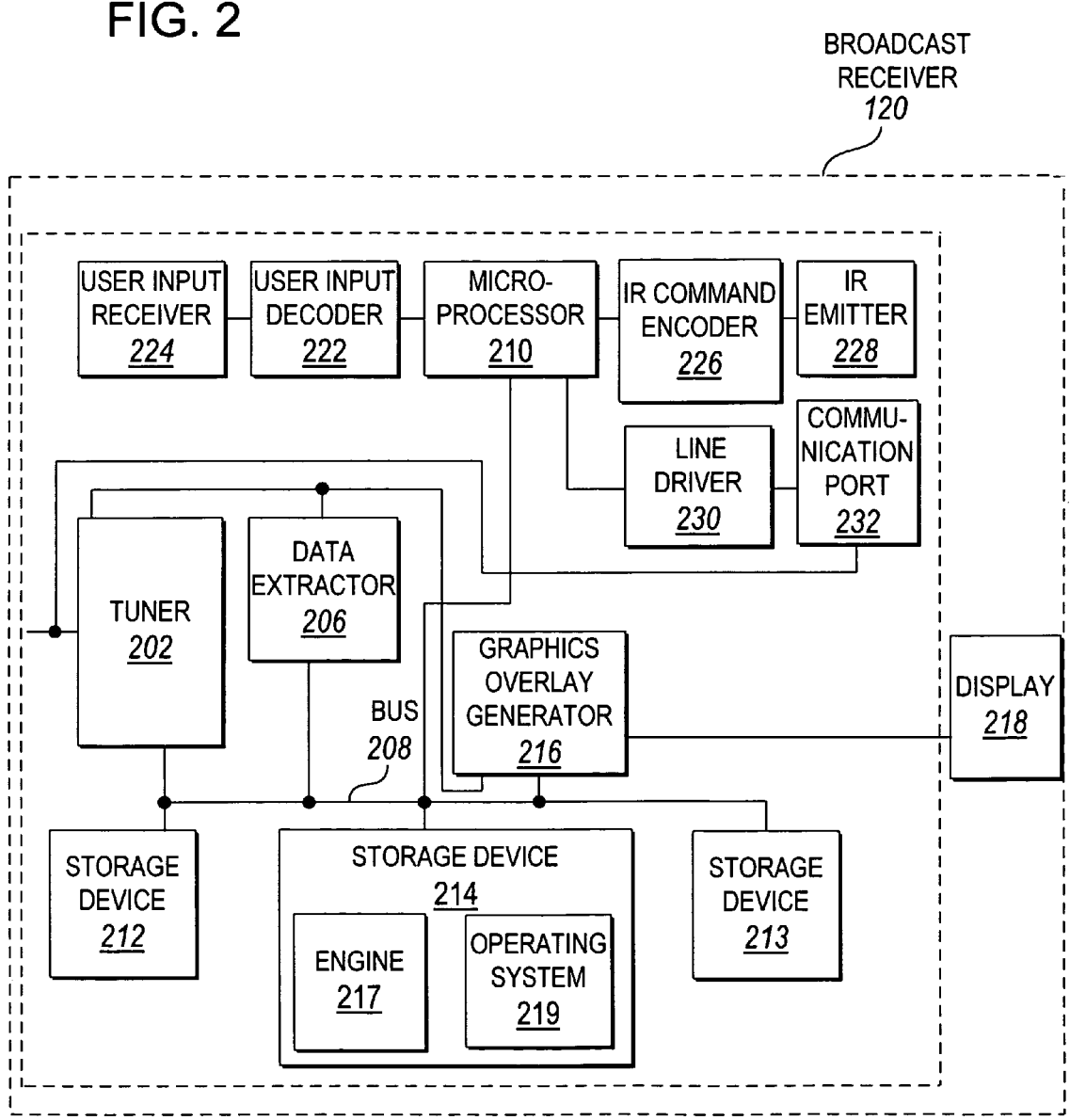
FIG. 2 is an illustration of a broadcast receiver.

FIG. 2 illustrates an embodiment of the BR 120 according to an embodiment of the present invention. In one embodiment, the BR 120 is the General Instrument CFT-2200 CATV set-top decoder. The BR 120 includes a tuner 202 for receiving the broadcast data 117 from the transmitter 118. In one embodiment, the tuner 202 is a conventional cable television tuner. In other embodiments, the tuner is a television broadcast tuner, a FM radio tuner, a digital tuner, or some other form of tuner. In yet another embodiment, a personal computer with the appropriate hardware and software may function to display broadcast programs received over various types of transmission channels, including cable, the Internet, and satellite. The embodiment illustrated in FIG. 2 shows a display 218, typically a television, within the BR 120. As mentioned above, the display 218 may also be located external to the BR 120.

The BR 120 also includes a data extractor 206 coupled to the tuner 202 for extracting the interactive application from the broadcast data 117. In one embodiment, the data extractor 206 is a conventional VBI inband data extraction circuit. In another embodiment, the data extractor 206 is a conventional modem. The data extractor 206 provides a serial bitstream containing the extracted interactive application onto a bus 208. The bus 208 is coupled to a microprocessor 210 which stores, via the bus 208, the extracted interactive application into a first storage device 212 as instructed by a program stored in a second storage device 214. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM"). A third storage device 213, which may be RAM or flash memory, is coupled to the microprocessor 210 to store reminder data. An advantage of flash memory is that software or data resident in the BR 120 can be modified by a received interactive application.

In one embodiment, the BR 120 also uses the data extractor 206 to extract a time signal from the broadcast data 117. The time signal indicates the current time using a standard timebase, such as Coordinated Universal Time ("UTC") or the subscriber's local time. In another embodiment, the BR 120 has a real-time clock that is either set by the subscriber or the received time signal. Regardless, the BR 120 preferably has access to the current time and, accordingly, can perform date stamping and timing functions.

As described below, the microprocessor 210 uses the program stored in the second storage device 214 and the interactive application stored in the first storage device 212 to execute the interactive application and provide an output. The program stored in the second storage device 214 is preferably an execution engine 217 for executing an interactive application defined by various scripts, forms, definitions, and code and graphic resources. A preferred execution engine is the Wink Engine provided by Wink Communications, Inc. of Alameda, Calif. The broadcast receiver 120 includes either as part of the execution engine 217, or the native operating system 219 also stored in the second storage device 214, timer functions that can be run as background processes to countdown from an input value, or equivalent timing specification.

The output from executing an interactive application may be, for example, a form presenting information or a menu to a television viewer or for receiving viewer input, or it may be a response, silent or otherwise, containing BR 120 or television usage data or indicating viewer preferences. For purposes of the present invention, the forms may present any variety of information, and take any variety of user responses. To this end, the BR 120 preferably includes a graphics overlay generator 216 coupled to the bus 208 and driven by the interactive application 115 stored in the first storage device 212 and the program stored in the second storage device 214. The graphics overlay generator 216 generates a graphical display responsive to the interactive application 115. This graphical display is displayed on a display 218, typically a television, coupled to the BR 120. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application 115, for example, to input data into a displayed form. In one embodiment, the microprocessor 210 is also coupled to a user input decoder 222 coupled to a user input receiver 224 to allow the user to communicate with the microprocessor 210 in order to respond to the interactive application 115. In one embodiment, the user input decoder 222 is a conventional infrared remote control decoder. The user input receiver 224 is preferably a conventional infrared receiver 224 with which the user may use a conventional hand-held remote control device. Remote control keys pressed by the user translate to coded infrared signals that are received by the user input receiver 224, are decoded by the user input decoder 222, and sent to the microprocessor 210 to allow the user to communicate with the interactive application 115.

In one embodiment, the BR 120 is a cable TV set-top decoder, connected to a cable system via a broadband coax cable. In this embodiment, line driver 230 is an RF modem which is capable of sending responses via the coax cable to the cable system head-end, typically using an out-of-band portion of the RF spectrum, and communications port 232 is a standard RF tap. In another embodiment, the BR 120 is a television, VCR, or set-top in which line driver 230 is a standard telephone modem and communications port 232 is a standard RJ-11 jack.

The microprocessor 210 may also be coupled to a conventional infrared command encoder 226, which accepts an infrared command input and encodes a signal for a conventional infrared emitter 228 to allow the interactive application 115 to control external devices.

C. Interactive Application Execution

Figure 3:
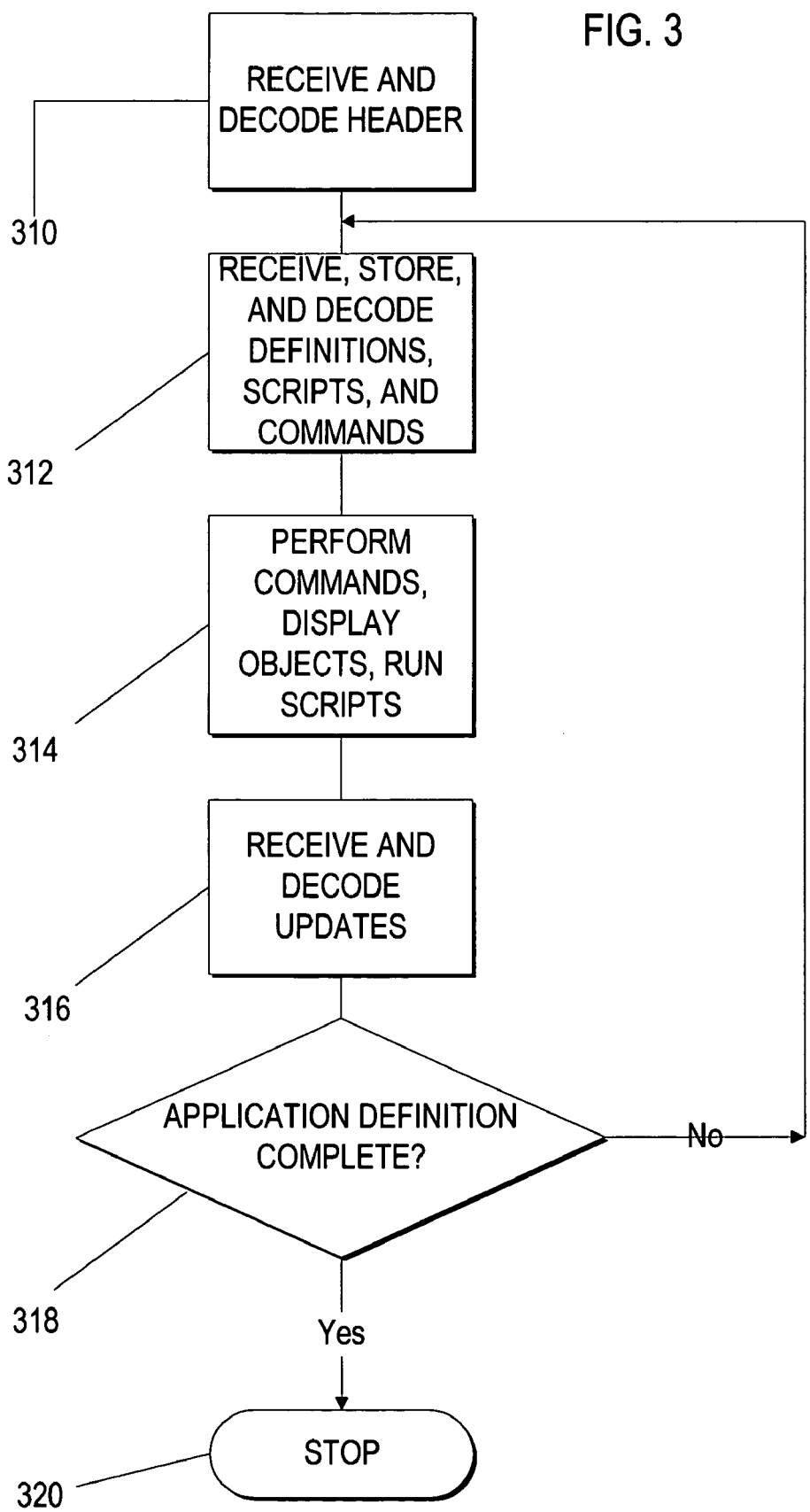
FIG. 3 is a flowchart of the overall process of receiving and executing interactive applications.

FIG. 3 is a flowchart illustrating steps for receiving and executing an interactive application using the compact information protocol according to a preferred embodiment of the present invention. The BR 120 receives and decodes 310 an application header record prepared by the broadcast server 110, inserted by the DIU 116, and transmitted by the transmitter 118. The application header record describes the information that follows and contains the interactive application identification code.

The reminder functionality of the interactive application is described by definitions, scripts, and commands which may be encoded and broadcast in any order. The definitions, scripts, and commands are received and decoded 312 by the BR 120 and define the reminder and response parameters used when executing 314 the reminder interactive application.

Some or all of the received reminder interactive application may be stored 312 within the BR 120. In one embodiment, the interactive application is repeatedly broadcast, allowing a BR 120 to tune to a program at any time yet receive the entire interactive application. Any desired updates to the stored interactive application may be received and decoded 316. If there are additional or updated definitions, scripts, or commands, they may be sent until the application is complete 318. In one embodiment, a termination command may be broadcast to stop 320 the interactive application.

A new interactive application may be sent at any time, including while an original application is executing or transmitting a response. For example, a new interactive application corresponding to a commercial may interrupt an original application corresponding to a news program, and the present invention enables the latter application to resume operation upon termination of the former.

In other embodiments using different forms of interactivity, such as URLs, the broadcast receiver 120 provides the appropriate decoding, parsing, and execution functionality as pertinent to the interactivity type. Thus, for URL type data, the broadcast receiver 120 may include a browser and the appropriate mechanisms for retrieving, loading, and displaying web pages, JAVA applets, and the like.

D. Automation Server

1. Behavioral Overview of the Automation Server.

The automation server 108 interfaces with the scheduling system 106 to receive the control signals the latter provides to the broadcast program sources 102. The automation server 108 is further communicatively coupled to the broadcast server 110 to receive status information about which interactive applications are prepared to be broadcast, or are currently being broadcast on which channels. The automation server 108 uses the status information including its playlist, and the control signals to generate specific commands to the broadcast server 110. These commands instruct the broadcast server 110 to selectively control the preparation of an interactive application to be broadcast, or the execution of an interactive application that is currently being broadcast.

In particular, the automation server 108 generates in response to the control signals, commands to the broadcast server 110 to schedule, start, stop, or cancel execution of an interactive application. The automation server 108 generates sequences of these commands to effect the synchronous execution, including display and/or termination, of the appropriate interactivity for both commercials and television shows, and other broadcast programs.

The control signals from the scheduling system 106 are either explicitly or implicitly associated with particular channels. From the nature of the control signal, its channel assignment, and playlist information, the automation server 108 determines the state and type of the current broadcast program being aired, or the next broadcast program to be aired, as may be appropriate. In particular, the automation server 108 determines if the control signal indicates that the currently broadcast program is a television show or a commercial.

In response to receiving a control signal indicating that a commercial has began broadcasting on a particular channel (i.e. a control signal to one of the broadcast sources to play broadcast data for a commercial) the automation server 108 determines whether an interactive application is currently executing on that channel, and if so, generates a command to the broadcast server 110 to suspend (stop) execution of the interactive application. The broadcast server 110 transmits this command to the broadcast receiver(s) 120. Those broadcast receivers tuned to the appropriate channel suspend execution of the interactive application. The automation server 108 does not however cancel the interactive application, since the broadcast receiver 120 will need to execute the interactive application again once the commercial(s) is over, and thus the interactive application should be available to execute again immediately, and should preserve the state information it had when the commercial(s) began.

The automation server 108 may also determine if there is an interactive application associated with the commercial. If so, the automation server 108 instructs the broadcast server to transmit the interactive application and cause its execution. If there is not an interactive application specifically associated with the commercial, the automation server 108 may signal the broadcast server to begin execution of a default interactive application.

At some point the automation server 108 receives a control signal indicating that the commercial is over. In response to this control signal, the automation server 108 generates a command to the broadcast server 110 to resume execution of the interactive application, which in turn transmits the command to the broadcast receivers 120. Those broadcast receivers that are tuned to the appropriate channel receive this command, and resume execution of the interactive application for the television program.

The effect perceived by the viewer here is that the interactive application that accompanied the original television show is removed from the television screen during the commercial(s). Interactive applications specific to the commercials, or default applications, are executed and displayed during the commercials. When the commercial(s) are over and the television show is resumed, then the interactive application for the television program re-appears. When the interactive application reappears, it has the state information (e.g. current score) that it had prior to the commercial, thereby preserving the viewer's use of the interactive application.

It is typical that a broadcast program, such as a television show, has this format of multiple segments, separated by commercial periods. Interactivity that is associated with the television program should be consistently available with its state information throughout each of the segments. The automation server 108 achieves this result by correlating information extracted from the control signals and identifying each segments that is broadcast so as to determine if the multiple segments are in fact parts of a single television show or other broadcast program and thereby associated with the same interactive application. Having so correlated the otherwise unrelated segments, the automation server 108 is able to appropriately suspend and a resume a single interactive application for the television program across multiple commercial periods. This process is explained in further detail with respect to FIG. 12, below.

The automation server 108 may be embodied as a software product that executes on a conventional workstation or personal computer, such as one that uses the Intel chipset and Microsoft Corp. operating system, or it may be encoded in special purpose ASIC or other hardware embodiment.

2. Functional Overview of the Automation Server

Figure 4:
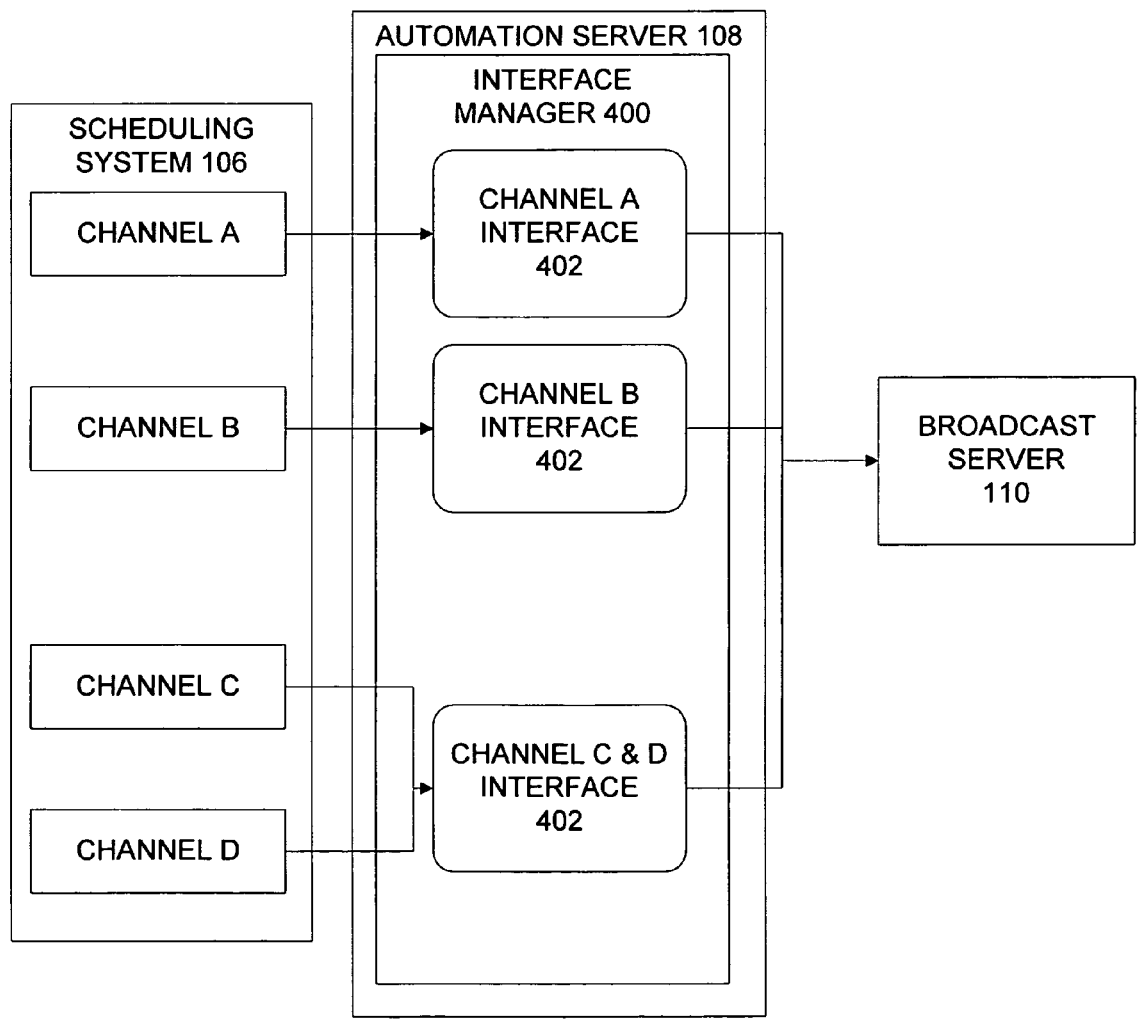
FIG. 4 is an illustration of the automation server in an embodiment of the present invention.

Referring now to FIG. 4, there is shown an illustration of the functional architecture of the automation server 108 in accordance with one embodiment of the present invention. In this embodiment, the automation server 108 includes an interface manager 400. The interface manager 400 manages a plurality of channel interfaces 402, each of which is associated one or more channels. Each channel interface 402 receives control signals for its assigned channel(s) from the scheduling system 106, and outputs commands to the broadcast server 110.

Figure 5:
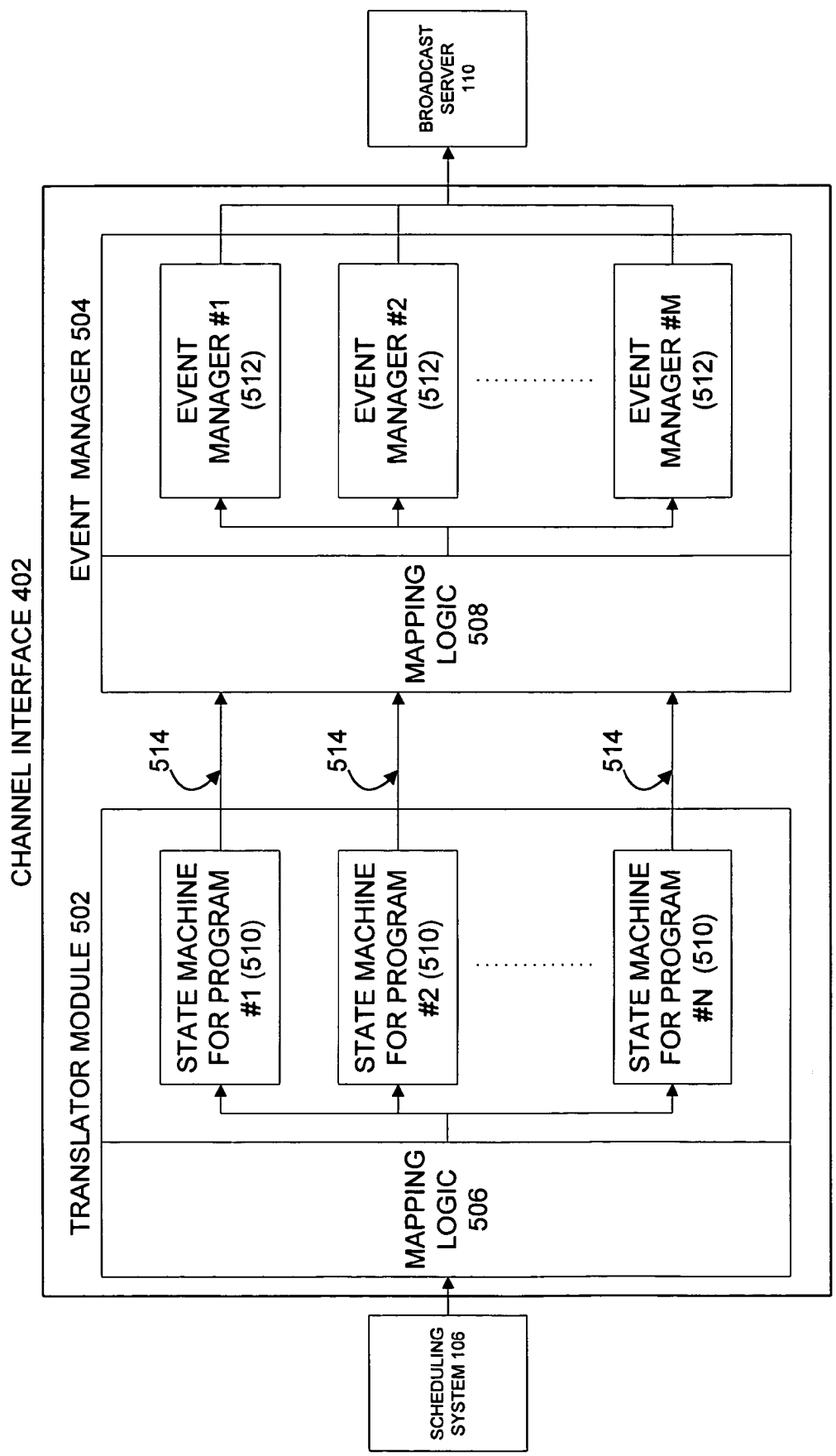
FIG. 5 is an illustration of a channel interface, including a translator module and event manager.

Referring now to FIG. 5 there is shown the functional structure of a channel interface 402. Each channel interface module 402 includes a translator module 502 and an event manager 504. The translator module 502 receives the control signals from the scheduling system 106 and translates these signals into atomic commands. The event manager 504 receives the atomic commands and processes them into commands that the broadcast server 110 understands.

3. Interface Manager

Figure 6:
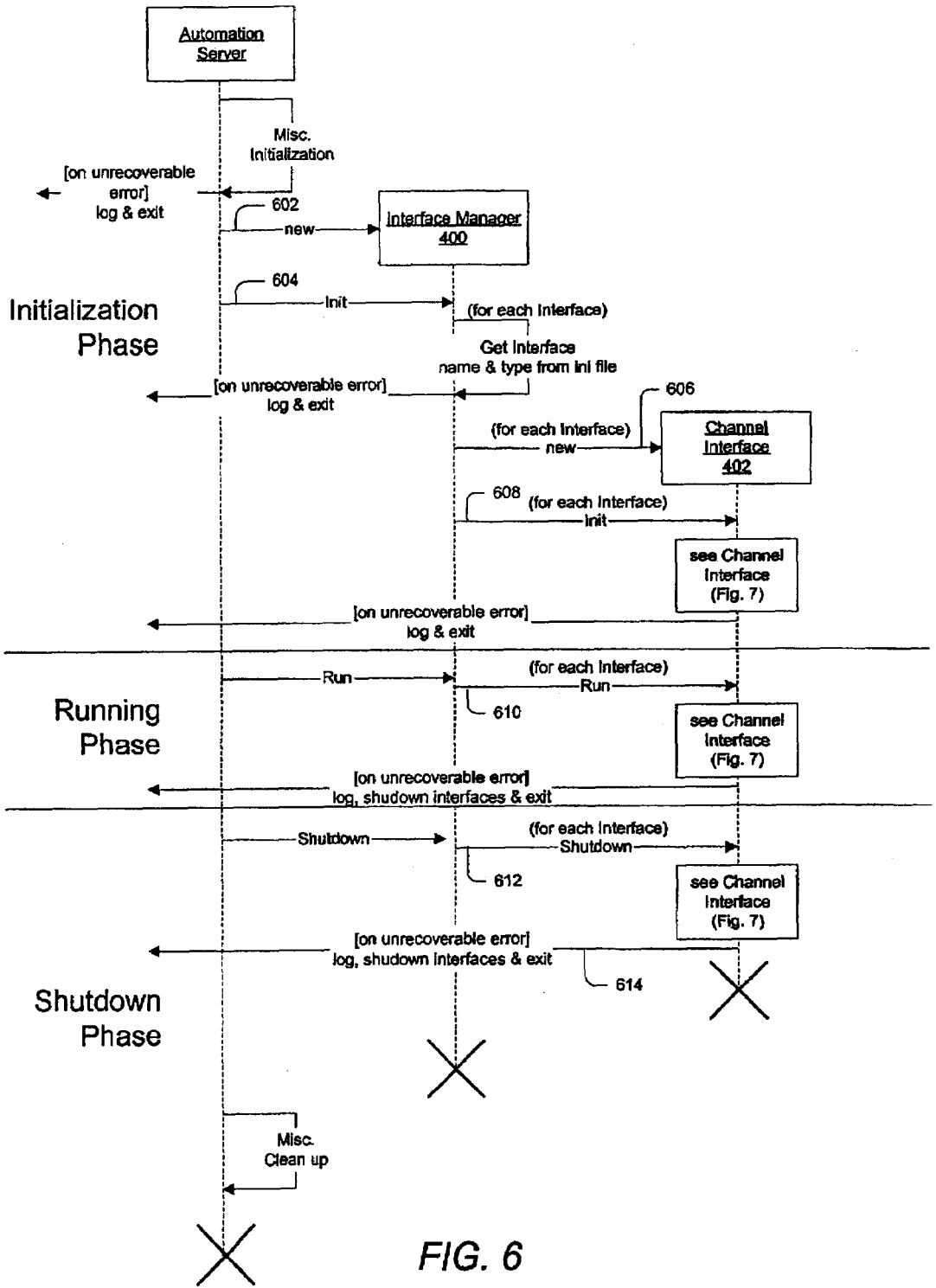
FIG. 6 is a lifecycle diagram of the interface manager.

Referring to FIG. 6, there is shown a lifecycle interaction diagram of the interface manager 400. The interface manager 400 creates and maintains all the channel interfaces 402 for different scheduling systems 106. The interface manager 400 has three main phases; an Initialization Phase, a Running Phase, and a Shutdown Phase. When the automation server 108 starts up, it creates 602 an interface manager 400 and initializes it. During this Initialization phase, the interface manager 400 reads 604 an initialization (ini) file and creates 606 and initializes 608 different channel interfaces 402 required to work with the scheduling system 106.

Once the interface manager 400 has created and initialized all the necessary objects, it transitions into the Running Phase. During this phase, the interface manager 400 requests 610 each channel interface 402 to run.

Normally, the automation server 108 and its interface manager 400 will stay in the Running Phase for long periods of time. But when there is an unrecoverable error or if the automation server 108 needs to be upgraded, then automation server 108 is shutdown. During this Shutdown phase, the interface manager requests 612 each channel interface 402 to shutdown.

Figure 7:
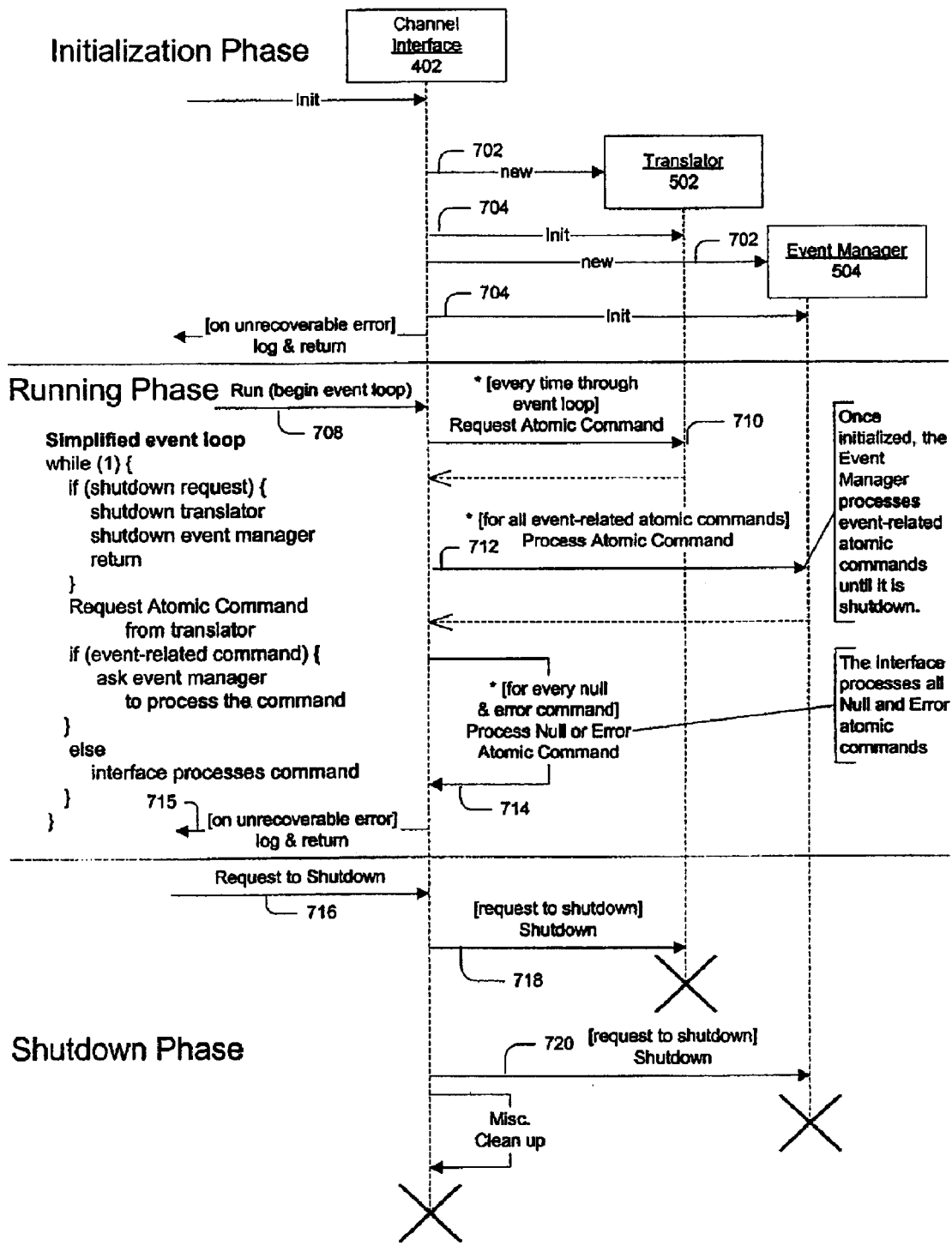
FIG. 7 is a lifecycle diagram of a channel interface, including its translator module and event manager.

Referring to FIG. 7, there is shown the lifecycle interaction diagram for each channel interface 402. As shown in FIG. 4, each channel interface 402 contains a translator module 502 and an event manager 504. A channel interface 402 also has the three main phases: the Initialization Phase, the Running Phase, and the Shutdown Phase.

During the Initialization Phase, it creates 702 and initializes 704 the translator module 502 and the event manager 504. The event manager's 504 initialization parameters include the following information.

How to configure broadcast server events for each event type,
Where to find the interactive application,
Parameters to fine tune the automation server's timing,
How to connect to the broadcast server,
How to respond to abrupt disconnection from the broadcast server, and
Whether the events are pre-scheduled.

The translator module's 502 initialization parameters include the following information.

How to connect to the scheduling system,
How to respond to abrupt disconnection from the scheduling system,
Scheduling system-specific parameters like how to interpret a particular command if it can be used differently by different broadcasters,
Fine tuning for how to read and interpret the commands from the scheduling system, and
Regular expressions or other information used to differentiate commercials from shows.

During the Running Phase, the channel interface 402 goes into an infinite loop (event loop) 708 to process any control signals from the scheduling system 106. The channel interface 402 may also receive requests directly from a separate automation server client (e.g. shutdown requests). The channel interface 402 requests 710 atomic commands from the translator module 502 and if they are event-related, then it passes 712 them to the event manager 504. If an atomic command is a Null command or an Error command, then the channel interface 402 processes 714 those commands itself. If an unrecoverable error occurs, then it logs the error and exits 715 from the event loop.

During the Shutdown Phase, the channel interface 402 has received 716 a Shutdown request, so it forwards 718 the request to the translator module 502 and the event manager 504 so they can cleanly shutdown. Once they have shutdown, the channel interface 402 cleans itself up and returns from the event loop to shut itself down.

4. Overview of the Translator Module

Each broadcast program may be understood as having a specific "lifecycle." This lifecycle in managed by the scheduling system 106 which likewise operates essentially as a state machine with respect to each broadcast program. However, the scheduling system 106 only provides a limited amount of information about a broadcast program, typically only as much as needed to control a broadcast source.

For each broadcast program then, the translator module 502 reconstructs of the state machine behavior on the limited information it receives from the scheduling system 106 to re-create the lifecycle of the broadcast program. This in turn allows it to provide the appropriate atomic commands to the event manager 504 for managing interactive applications that may be relevant to the broadcast program. Thus, as shown in FIG. 5, the translator module 502 creates and maintains a state machine 510 for each unique broadcast program that it identifies in the control signals from the scheduling system 106.

Each translator module 502 is specific to the type of scheduling system 106 with which it communicates, and provides a mapping of the states from the scheduling system 106 to a set of events that the translator module 502 can understand. Since each type of scheduling system 106 provides different types of information in its control signals, there is a need to account for errors, missing information, and so forth, to map from the implicit state machine of the scheduling system 106 to a state machine which is defined by the translator module 502.

As noted, there are various types of scheduling systems 106, each of which outputs different types of control signals having various levels of information, and thus each of the translator modules 502 corresponds to a certain type of scheduling system 106. However, it is believed that all scheduling systems 106 can be described with respect to an 'ideal' scheduling system 106 which provides the most complete set of control signals. Table 1 describes the types of control signals provided by an ideal scheduling system 106, and the data that is included in each of these ideal signal types.

TABLE 1

Control Signals for Ideal Scheduling System

| Control Signal | Data |
| --- | --- |
| Pre-load | Program ID |
| | Channel |
| | Event type |
| | Duration |
| | Interactive application location |
| Pre-roll | Program ID |
| | Channel |
| Event starts | Program ID |
| | Channel |
| Event stops | Program ID |
| | Channel |

These signals are ideal in the sense that if all of the specified data is present, the translator module 502 can very easily determine the appropriate state of the broadcast program, and form the needed data for communication to the event manager 504. In non-ideal scheduling systems 106, the translator module 502 uses additional external sources of data to determine the appropriate data for transmitting to the event manager 504, such as the broadcast server 110's playlist, and information on the relationship of interactive applications to broadcast program identifiers as contained in the interactive application database.

The pre-load signal is a control signal that is typically used by a scheduling system 106 to cause a broadcast source 106 to load a broadcast program in anticipation of being broadcast at a subsequent time. Ideally, this signal includes a program ID which uniquely identifies the broadcast program to be loaded. A channel identification specifies the channel for the broadcast; the channel may be implicit or explicit. The duration specifies the duration of the broadcast program. This is used by the automation server 108 to cause termination of an interactive application in the absence of an explicit stop signal from the scheduling system 106.

The pre-load signal may or may not be received at a precise time. That is, in some scheduling systems it is received precisely (to partial second accuracy in advance of the broadcast of the event). In others it could be received from seconds to hours in advance of the broadcast of the event. The pre-roll, event starts, and event stops signals must be precisely timed. If a native control signal is being used for both pre-load and any of the other control signals it must be precisely timed.

The interactive application location specifies the location of an interactive application that is designated to accompany the broadcast program. This location is specified within the interactive application database 112, or may be a path name into a file directory where the interactive applications are stored. The event type defines the type of broadcast program. The number of types is dependent on the system design, and may differentiate simply between television shows and commercials, or further identify program guides, close-captioning, or other types of broadcast content. Event types are discussed further below with respect to the event manager 504, and Table 7.

As these signals and their data content are for an ideal scheduling system 106, actual scheduling system 106 may use fewer ones of these signals, and only some of the specified data, or both. However, the translator module 502 and the event manager 504 operate to complete whatever data is missing from these control signals, and thereby manage the broadcast server 110.

Given the ideal control signals, an 'ideal' translator module 502 can be defined. This ideal translator module 502 maps the control signals from the scheduling system 106 into a set of atomic commands which are used by the event manager 504. This ideal translator thus represents the lifecycle of any broadcast program and how the event manager 504 can respond to the different states of the broadcast program's lifecycle to generate commands to the broadcast server 110 to control the execution of an interactive application associated with the broadcast program.

Table 2 lists the atomic commands generated by the translator module 502:

TABLE 2

Atomic Commands to Event Manager

| Atomic Command | Data for Command | Description |
| --- | --- | --- |
| Schedule | Program ID, Channel, Event Type, interaction application fileLocation (optional), Duration (optional) | Instructs the event manager 504 to identify an interactive application associated with the program ID for the broadcast program, and request the broadcast server to prepare to broadcast the identified interactive application. |
| Start | Program ID, Channel | Instructs the event manager 504 to identify an interactive application associated with the program ID for the broadcast program, and to request the broadcast server to start broadcast of the identified interactive application. |
| Stop | Program ID, Channel | Instructs the event manager 504 to identify an interactive application associated with the program ID for the broadcast program, and to request the broadcast server to stop broadcast of the identified interactive application. |
| Cancel | Program ID, Channel | Instructs the event manager 504 to identify an interactive application associated with the program ID for the broadcast program, and to request the broadcast server to stop broadcast of the identified interactive application, and unload the interactive application. The Cancel command may be understood as opposite of the Schedule command. |
| Secondary Trigger | Program ID, Channel | Instructs the event manager 504 to request the broadcast server to trigger specific behavior in the broadcast interactive application. |

Since it takes time for the broadcast server 110 to schedule an interactive application, in some circumstances the translator module 502 may not send a schedule atomic command early enough to allow the interactive application to be synchronized with the video data that is being broadcast. In this case the interactive applications can be pre-scheduled on the broadcast server 110 by some other manual or automatic process and the automation server 108 can save time by looking for the pre-scheduled interactive application instead of instructing the broadcast server 110 to schedule it. In this mode, the automation server 108 does not cancel pre-scheduled events since they may be broadcast again. Instead, the process that scheduled them is responsible for canceling them.

Figure 8:
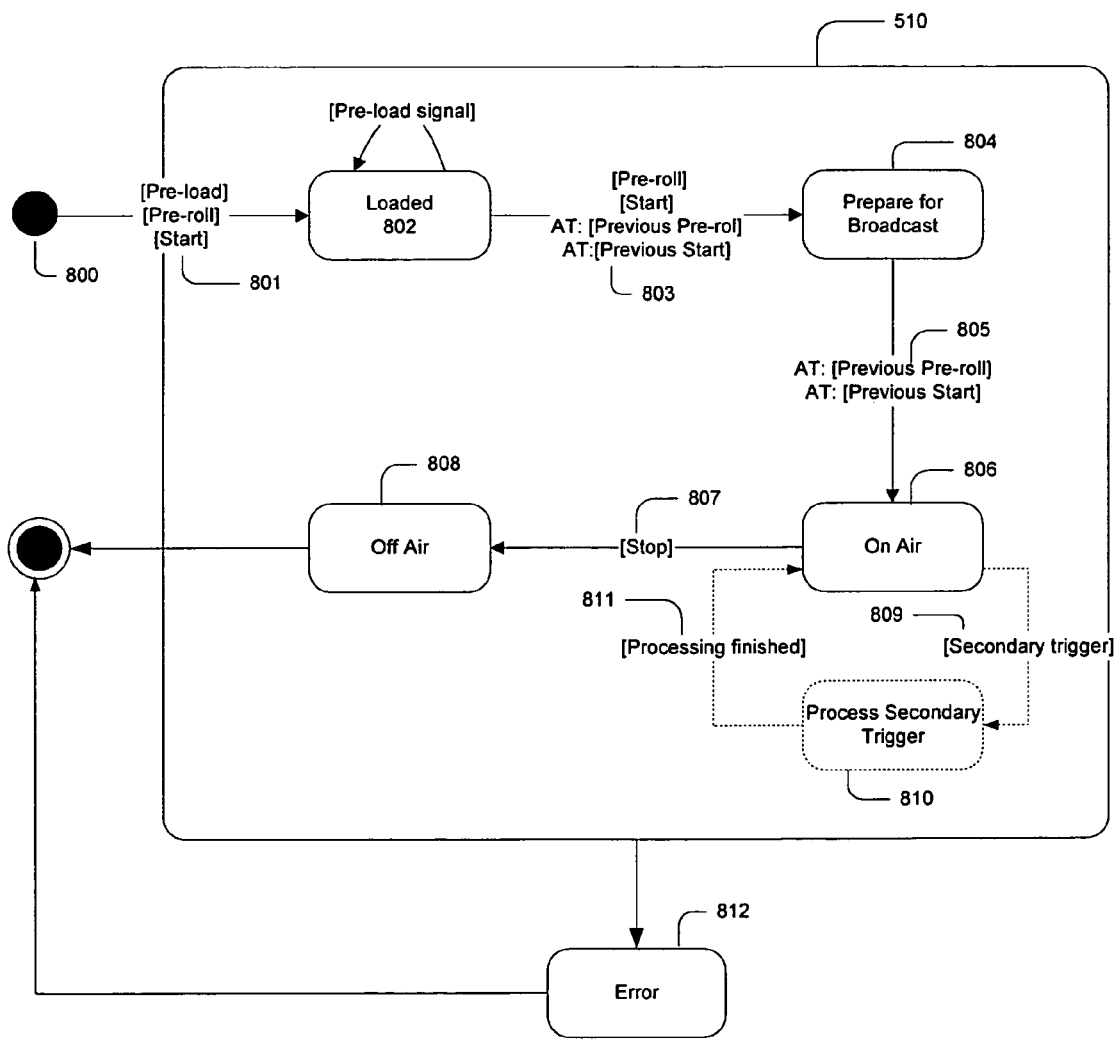
FIG. 8 is a state machine diagram for an ideal translator.

The actual translator modules 502 for any specific scheduling system 106 are derived from the ideal translator module 502. Referring now to FIG. 8, there is a shown a state machine description of an ideal translator state machine 510. Each broadcast program may be understood to transition through a number of states defined by the control signals.

The state machine begins in the start state 800.

From this state, the translator module 502 transitions to the loaded state 802. The loaded state 802 may be reached from any of three different ideal signals 801: a pre-load, a pre-roll or a start signal.

Normally, the first control signal 801 received by the translator module 502 will be the pre-load signal. On the scheduling system 106 this signal indicates that the broadcast program is about to be broadcast. The start state 802 is also reached, as noted, on a pre-roll signal, if a pre-load signal has not be previously received. A pre-roll signal also indicates that the broadcast program is about to be broadcast.

In the loaded state 802, the translator module 502 determines the appropriate interactive application associated with the broadcast program and schedules its execution. The translator module 502 determines, as nearly as possible the ideal data for this state, such as the broadcast program ID, event type, and location of the associated interactive application for the broadcast program. Event type describes the type of broadcast program, such as a television show, commercial, or unknown. Event types are further described below. In some cases the channel assignment is implicit since the translator module 502 is associated with a specific channel; in other cases the channel may be explicitly encoded in the control signal.

More particularly, the translator module 502 logs the current time and signal that was received. The translator module 502 sets the program ID for the associated interactive application to the program ID contained in control signal. If necessary, the translator module 502 calculates the event type using regular expressions (see below). Otherwise the translator module 502 sets the event type to Unknown, and leaves it to the event manager 504 to determine from data contained in the interactive application itself. If necessary, the translator module 502 also sets the location of the interactive application to be the program ID; again the event manager 504 will determine the actual location based on the program ID and segment number of the broadcast program, as appropriate.

The translator module 502 then creates and outputs a schedule command to the event manager 504, using the created ideal data. This schedule command instructs the event manager 504 to determine whether there is an interactive application associated with the program ID for the broadcast program, and if so, request the broadcast server to prepare to broadcast the identified interactive application.

The next state is the prepared state 804. This state is reached from the loaded state 802 on either a pre-roll signal or a start signal. There are also automatic transitions to the prepared state 804 if a pre-roll signal or a start signal was the first signal 801 received. That is, if either of these signals are received as the first signal 801, then the translator module 502 transitions automatically through the loaded 802, prepared 804, and on air 806 states. The prepared state 804 controls the timing of the atomic commands sent to the event manager 504. Before it is started up the automation server 108 is configured as to how early before the start of the broadcast of the scheduling system event a pre-roll signal may be received. This is usually between 1 to 10 seconds and is usually measured in milliseconds. Upon receiving a pre-roll or start signal the ideal translator module enters the prepared state 804. The prepared state 804 preferably pauses for X-Y microseconds, where X is how early the pre-roll signal comes and Y is the amount of time required for the event manager 504 and broadcast server 110 to start the interactive application (event) for the broadcast program. After that time has elapsed, the translator module 502 automatically transitions to the on air state 806 where the event is started. It also generates a start signal 805 that may be used by other event state machines (see section on Off Air state below). Note that if X-Y is less than zero or if the control signal is an start signal, then the prepare state 804 does not wait at all. Instead it just transitions to the on air state 806 to allow the broadcast server event to be started as soon as possible.

The "on air" state 806 occurs automatically after the prepared state 804. In this state, the translator module 502 creates and sends a start atomic command to the event manager 504. When combined with the pause introduced in the prepared state 804, this has the effect of starting the interactive application to begin execution with the broadcast program.

During the on-air state 806 additional signals which form secondary triggers 809 may be received and processed 810. These secondary triggers may result in execution of additional functionality associated with the interactive application being broadcast.

An event stop signal 807 terminates its broadcast, resulting in an "off air" state 808. This state cancels the event. That is, the translator module 502 creates a cancel command based on the current program ID, and sends this to the event manager 504 to cancel the current interactive application. This state can be triggered by control signals associated with other events. For example, if the scheduling system's native control signals to not include an event stops signal, then the event starts signal for the next event will cause the previous event to be stopped.

On an error signal, the translator module 502 creates a cancel command based on the current program ID, and sends this to the event manager 504 to cancel the current interactive application.

These states thus represent the lifecycle of each broadcast program, from the perspective of a scheduling system 106. From this information, the automation server 108 determines the state for an interactive application associated with the broadcast program, and generates appropriate commands to the broadcast server 110 for that state.

Accordingly, a translator module 502 is designed to manage the broadcast programs on a specific channel in correspondence with these states. More particular, the translator module 502 maintains a state machine 510 for each broadcast program ID that it receives. This state machine is created each time a new broadcast program ID is received, and maintained until the scheduling system 106 indicates that the broadcast program is terminated.

Figure 9:
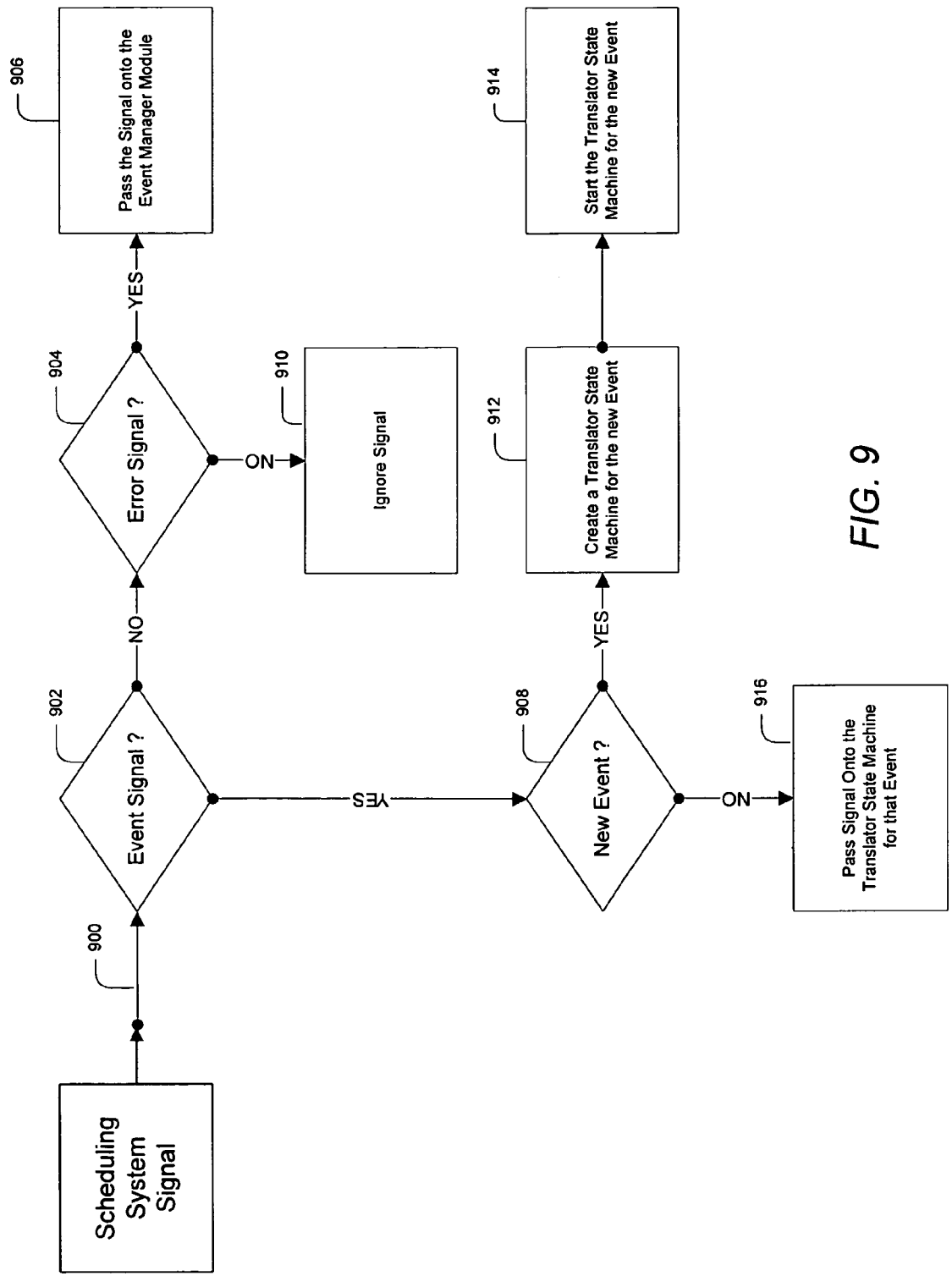
FIG. 9 is a flowchart of the translator module's mapping logic.

Referring to FIG. 9, there is shown a flow chart of the overall operation of the translator module 502, and particularly its mapping logic 506. Each time the translator module 502 receives 900 a control signal from the scheduling system 106, it determines 902 whether the control signal relates to an event which it manages. An event is indicated by a program ID or other data indicative of a broadcast program, as opposed error signals or other data, such as startup, shutdown, error, or system messages.

If the control signal is not for an event, the translator module 502 determines 904 if it is an error signal. Error signals are passed 906 to the event manager module 504 for handling.

If the control signal is not an error signal, then it is ignored 910.

If the signal is an event signal, the translator module 502 applies mapping logic 506 to determine whether the identified event is a new event or one for which there already exists a state machine 510, using the program ID of the event as the key to the state machine. If the event is a new event, then the translator module 502 instantiates 912 a new state machine 510 for the program ID and event, and starts 914 the state machine 510.

If there is an existing state machine, the event control signal is passed 916 to the state machine 510 associated with the program ID. The state machine 510 then handles the event according to its state logic as described above with respect to the ideal state machine, and as further elaborated below with respect to the specific translator types.

5. Translator Types

Each scheduling system 106 generates its own particular set of control signals that are interpreted by a translator module 502. The following sections describe how specific translator modules are implemented in terms of the ideal translator module's state diagram. That is, the scheduling system-specific control signals can be mapped onto the generic control signals in the ideal translator. Each specific translator module 502 goes through the same states as described in the ideal translator module. However, the state actions for each specific translator vary slightly to account for differences in the control signals that they receive.

The mapping from ideal translator state machine to specific state machine for each type of translator is summarized in the following tables 4-6. The column headings for these tables are defined in Table 3:

TABLE 3

Column Headings for Tables 4-6

| Column Heading | Description |
| --- | --- |
| Specific Signal | The scheduling system-specific control signal received by the translator module. |
| Specific Signal's Data | The data included with that scheduling system-specific control signal. |
| Ideal Signal | The ideal control signal that the system-specific control signal maps to. |
| Ideal Data | The data required by the ideal control signal. If some of it is not available in the system specific control signal's data, then it will be calculated either in the state actions or in the event manager. |
| State Transition | The state that is transitioned into by this control signal. In some cases this will be an automatic transition (i.e. no control signal is required to move from the previous state into this one). | a) Translator Type 1: Basic Scheduling System

A basic scheduling system 106 is one which encodes very little data in its control signals, typically no more than a program ID. Interpretation of this control signal via the translator's state machine involves creation and inference of appropriate data to recreate what would have been the ideal data for an ideal control signal. An example of a basic scheduling system 106 is a Louth ADC-100.

In one embodiment, the automation server 108 interfaces with a basic scheduling system by emulating a subtitler. In one embodiment, such as with a Louth scheduling system, the emulated subtitler is the Cavena Subtitler. Normally, the basic scheduling system 106 sends signals to the subtitler to prepare a subtitle, start a subtitle, and stop a subtitle that is being displayed over the video program data of a broadcast program. In the present invention, the automation server 108 uses these control signals to synchronize interactive applications with video.

Some basic scheduling systems 106 preferably have the ability to provide pre-roll information. In this case, it sends a Prepare Signal a configurable number of seconds in advance of the actual start of the broadcast program. The automation server 108 uses this information to pre-load and start the interactive application earlier so it can reach the user right when the broadcast program starts. Accordingly, the type 1 translator transitions through Loaded 802, Prepared 804, and On Air 806 states when it receives the Prepare signal. This is described in Table 4 as an Automatic Transition.

When the automation server 108 receives a Start Signal 805 from a basic scheduling system 106, it knows that the interactive application has already started using the Prepare Signal, so it ignores the Start Signal. If there is an Error in the basic scheduling system's control signal, the automation server 108 stops the current interactive application and moves to the Error State 812.

Table 4 summarizes the relationships between native control signals for a basic scheduling system 106, the ideal control signals, and the state transitions for the state machine of the ideal translator module 502.

TABLE 4

Control Signals and State Transitions for Translator for a Basic Scheduling System

| Scheduling System Signal | Control Signal Data | Ideal Signal | Ideal Data | State Transition |
| --- | --- | --- | --- | --- |
| Prepare Signal | Program ID | Pre-load | Program ID Event Type Channel Interactive application location | Loaded |
| None | None | Pre-roll | Program ID Channel | Prepared (Automatic Transition) |
| None | None | On Air | Program ID Channel | On Air (Automatic Transition) |
| Start Signal | None | None | None | None |
| Stop Signal | None | Off Air | Program ID Channel | Off Air |
| Error | None | Error | None | Error | b) Translator Type 2: Code-Based Scheduling System

A second type of scheduling system 106 is one that uses identification codes to selectively distinguish between television shows and commercials. An example of this type of scheduling system 106 is an ISCI code-based system such as used by ESPN Inc. in its broadcast systems. In this type of system, ISCI codes are present in the broadcast programs such as commercials and not present in television shows. These types of codes may be provided directly by the scheduling system 106 or indirectly from being pre-recorded on the media (e.g., video tape) in conjunction with the broadcast programs.

Other types of code-based systems include those that use codes that individually identify interactive applications, URLs, URI's, and the like.

The automation server 108 interfaces with a code-based scheduling system 106 through a VITC timecode reader or similar timecode readers. The code-based scheduling system sends ISCI information during commercials through a VITC timecode and no ISCI information during shows. The automation server 108 uses this information to selectively add interactive applications during commercials and shows. Since the scheduling system's control signals do not specify a show by program ID, only a default interactive application is supported.

Generally, when the control signal contains the presence of an ISCI or similar code, the translator 502 knows that a commercial has started. Accordingly, the state machine 510 transitions through Loaded, Prepared, and On Air states and starts the interactive application. These transitions occur automatically as described in Table 5 as Automatic Transitions. In the Loaded state, the ISCI code (or other code such as URL, application identifier, and the like) is used as the program ID (e.g., saving the code as the program ID) for ideal data. This allows the event manager 504 to determine the appropriate interactive application.

On a change in ISCI code, the translator 502 knows that a new commercial has begun. Accordingly, the state machine 510 transitions through Off Air state and stops the interactive content, creating the cancel atomic command to cancel the current interactive application for the commercial. The translator 502 creates a new state machine 510 for the new ISCI code, that state machine 510 transitions through Loaded, Prepared, and On Air states, and a start atomic command is generated to start the new commercial's interactive application.

When the control signal does not contain an ISCI code, the translator 502 knows that a television show has started (or is in progress). Accordingly, the state machine 510 transitions through Off Air state and stops the interactive content, creating the cancel atomic command to cancel the current interactive application for the commercial. Based on the same signal (i.e. the absence of any ISCI code) a new state machine 510 for an unknown program ID with a show event type is created. As discussed below, the event manager will determine that this program ID should be associated with the default show. The state machine 510 goes through Loaded, Prepared, and On Air states, and generates a start atomic command to start a default application for the television show. When an ISCI code is detected again, the state machine 510 goes through the Off Air state, and cancel atomic command is generated.

Because there are often small gaps of no data in code-based systems (especially during transitions between codes), the translator 502 will wait a configurable amount of milliseconds before detecting the absence of ISCI codes. This avoids false detections.

If there is an Error in the control signal, the state machine 510 also cancels the current interactive content and moves to the Error State.

Table 5 summarizes the relationships between native control signals for a code-based scheduling system 106, the ideal control signals, and the state transitions for the state machine of the ideal translator module 502 for both commercial events and the default show event.

TABLE 5

Control Signals and State Transitions for Translator for Code Based Scheduling System

| Scheduling System Signal | Control Signal Data | Ideal Signal | Ideal Data | State Transition |
|---|---|---|---|---|
| Commercial Control Signals | | | | |
| Presence Of ISCI Code or change in ISCI Code | ISCI Code | Pre-load | Program ID = ISCI code Event Type = commercial Channel Interactive application location | Loaded |
| None | None | Pre-roll | Program ID Channel | Prepared (Automatic Transition) |
| None | None | On Air | Program ID Channel | On Air (Automatic Transition) |
| Absence Of ISCI Code or change in ISCI Code | None Or Non-ISCI Data Or ISCI Code | Off Air | Program ID Channel | Off Air |
| Error | None | Error | None | Error |
| Default Show Control Signals | | | | |
| Absence Of ISCI Code | None Or Non-ISCI Data | Pre-load | Program ID = unknown Event Type = show Channel Interactive application location | Loaded |
| None | None | Pre-roll | Program ID Channel | Prepared (Automatic Transition) |
| None | None | On Air | Program ID Channel | On Air (Automatic Transition) |
| Presence Of ISCI Code | ISCI Code | Off Air | Program ID Channel | Off Air |
| Error | None | Error | None | Error | c) Translator Type 3: Playlist-Based Scheduling System

A third type of scheduling system 106 that its supported by the present invention is a playlist based scheduling system. In this type of system the control signals identify the program being broadcast and its duration, so as to provide the elements of a playlist; also included in some instances will be the program title of the broadcast program. An example of this type scheduling system is the Library Management System (LMS) BZCA-1100 multi-cassette system running the BZCA-1102 Spot Reel Option software, provided by Sony Corporation.

The automation server 108 interfaces with this type of scheduling system 106 by functioning as a control terminal. The control terminal displays a transmission playlist, which is a table of scheduled events. The LMS BAC-1200 control terminal is one example. The playlist contains event information such as the Program ID, Program Title, Duration, for each broadcast program.

The playlist based translator module 502 captures and parses all the event information received from the scheduling system 106. Events appear in a transmission playlist ahead of their broadcast time. When an event (e.g., broadcast program) appears in the transmission playlist, the In translator 502 pre-loads the interactive application for that event and transitions to the Loaded state 802. The scheduling system 106 provides pre-roll information for each event by sending an event status of a play control signal a configurable number of seconds in advance of the event going on air.

The translator module 502 transitions through the Prepared 804 and On Air 806 states and starts the interactive application when it receives the play control signal for an event. If the translator 502 misses the play control signal for an event due to network or some other problem and receives the on-air or online control signal for an event, it transitions to the On Air state 806 and starts the interactive application. In this case, the automation server 108 misses the benefit of Pre-roll information, but the interactive application is started nevertheless.

If the translator module 502 receives an on air or online signal, and is not already in the Prepared state 804, then it treats the on air/online signal as a Play signal, and first transitions to the Prepared state 804 and then automatically to the On Air state 806.

When event data disappears from the transmission playlist, the translator module 502 transitions to the Off Air state 808, and instructs the event manager 504 to cancel the current interactive application.

If any other kind of Error such losing a connection to the scheduling system occurs, then the automation server 108 stops the current interactive application and moves to the Error State.

Table 6 summarizes the relationships between native control signals for a playlist based scheduling system 106, the ideal control signals, and the state transitions for the state machine of the ideal translator module 502.

TABLE 6

Control Signals and State Transitions for Translator for Playlist Based Scheduling System

| Scheduling System Signal | Control Signal Data | Ideal Signal | Ideal Data | State Transition |
|---|---|---|---|---|
| Event data appears in the look ahead window | Program ID Program Title Duration | Pre-load | Program ID Event Type Channel Interactive application location | Loaded |
| Play | Program ID Program Title Duration | Pre-roll | Program ID Channel | Prepared |
| On Air or Online | Program ID Program Title Duration | On Air | Program ID Channel | On Air (Automatic Transition) |
| Event data disappears from the look ahead window | Program ID Program Title Duration | Off Air | Program ID Channel | Off Air |
| Error | None | Error | None | Error |

6. Translator Event Type Calculation based on Regular Expressions

Scheduling systems 106 that track the event type of a program ID can send that information directly to the automation server 108. Since many scheduling systems 106 do not support this feature, some broadcasters 114 use program IDs that differentiate between different types of programs like shows and commercials. The automation server 108 uses this information to its benefit. The translator 502 uses that information to determine which type of event to schedule. For example, the program ID of commercials may have a prefix of "VT" and the program ID of a television show may have a different prefix or none at all. The automation server 108 uses regular expressions with the program IDs to differentiate between commercials and shows. The event type is set to commercial if the program ID matches the criteria for a commercial or it is set to show if the program ID matches the criteria for a show, based on a regular expression analysis. If the broadcaster 114 does not name the program IDs so as to differentiate between shows and commercials, then the event type is set to Unknown. In such cases, the event manager 504 will look at the actual interactive application file for a flag that tells it whether the content is for a commercial or a show.

7. Overview of the Event Manager

Referring again to FIG. 5, the event manager 504 receives the various atomic commands 514 from the translator module state machines 510, and responsively instructs the broadcast server 110 as to the control of its interactive applications.

Generally, in a conventional system without an automation server 108, the broadcast server 110 sends interactive applications to a data insertion unit 116 according to a pre-defined playlist, which is a list of broadcast server events.

However, the automation server 108, via the control signals provided by a scheduling system 106, is able to automate the creation of the broadcast server's playlist and dynamically add, remove, and modify events on the broadcast server's playlist to match near real-time changes to the scheduling system's playlist. While the broadcast server's playlist may contain events for all channels, the event manager 504 only manages events on the channels for which it receives atomic commands.

FIG. 5 shows how the translator module 502 sends atomic commands 514 to the event manager 504. The event manager 504 interprets the atomic commands 514 to generate a stream of primitive commands to the broadcast server 110. As the event manager 504 receives atomic commands 514, it maps the program ID's contained therein to specific broadcast server events via mapping logic 508. If an appropriate broadcast server event does not exist for a particular program ID, then the event manager 504 will create a broadcast server event. In general, the event manager 502 will create, modify, or destroy broadcast server events as needed.

The event manager 504 maintains a separate state machine 512 for each broadcast server event that it manages. Each state machine is assigned to an event by the program ID of the event. Atomic commands from the translator module 502 are then routed to these state machines based on their program ID's. This process is described below in the Atomic Command Mapping Logic section. The event state machine 512 is responsible for generating the correct broadcast server primitive commands. It is described in detail in the Event State Machine section, below.

The use of two state machines of the translator module 502 and the event manager 504 enables any of the various different types of scheduling systems 106 to be easily interfaced with the automation server 108, while allowing for a relative simple and efficient event manager 504 implementation. This allows a new translator module 502 to be created for operation with a new scheduling system 106, without necessitating changes in the event manager 504.

Since different event types can cause the atomic command mapping logic 508 and the event state machines 512 to behave differently, the following section defines the various event types that the event manager 504 supports.

a) Event Types

Event types determine how a broadcast server event should behave. There are three different categories that define event behavior.

Program type,
Segmentation, and
Interactivity

Program type can be commercial, show, or unknown. A commercial is a self-contained piece of television programming that is usually short (30 to 120 seconds). A show is a television program that contains one or more segments. One or more commercials usually play between television show segments. If the automation server 108 cannot determine the program type from the control signals sent by the scheduling system 106, the type is set to unknown. Usually unknown events may be treated as self-contained programming like commercials, or they may be handled like television shows.

Program type and segmentation are intimately related. In a preferred embodiment, television shows are always treated as segmented, and commercials are always treated as not being segmented. Unknown programs can be treated as one or the other. The handling of segmented television shows is further described below with respect to FIG. 12.

Interactivity (e.g., an interactive application) can either be a normal interactive event or a default interactive event. A normal event is an event that has a specific interactive application associated with it. If the event manager 504 can not find a specific interactive application associated with an event in the interactive application database 112, it may substitute a default interactive application for the duration of the event. A null event may also be specified as the default event, which means no interactive application will be broadcast for the duration of the event.

The following table enumerates six event types and summarizes each event type's behaviors.

TABLE 7

Event Types

| Event Type | Program type | Interactivity | Segmentation |
|---|---|---|---|
| Commercial event | Commercial | Normal | No |
| Show event | Television Show | Normal | Yes |
| Unknown event | Unknown | Normal | Maybe |
| Default Commercial event | Commercial | Default | No |
| Default Show event | Show | Default | Yes |
| Default Unknown event | Unknown | Default | Maybe |

Event types are also used to determine broadcast server event settings.

b) Determining an Event Type

The event type is initially determined by the translator module 502 and passed to the event manager 504 in the atomic command 514. In some cases the translator module 502 does not have enough information to determine the actual event type. The translator module 502 makes an initial determination of event type, but the event manager 504 may change the event type if it has better information. The event manager 504 has two pieces of information that the translator module 502 does not have.

1. The event manager 504 knows if the interactive application exists for the program ID of the event, and
2. The event manager 504 can get the event type information from the interactive application. The application contains information that determines if it is suspendable or not. The automation server 108 assumes that all television shows are suspendable and all commercials are not suspendable.

Combining the event manager's and the translator module's information, the event manager 504 can determine the proper event type as summarized in the following table:

TABLE 8

Event Manager Type Determination

| Event Type Specified by Translator Module | Interactive Application exists? | Interactive Application's Event Type | Resulting Event Type |
|---|---|---|---|
| Show | Yes | Don't care* | Show |
| Commercial | Yes | Don't care* | Commercial |
| Unknown | Yes | Show | Show |

TABLE 8-continued

Event Manager Type Determination

| Event Type Specified by Translator Module | Interactive Application exists? | Interactive Application's Event Type | Resulting Event Type |
|---|---|---|---|
| Unknown | Yes | Commercial | Commercial |
| Show | No | Not available | Default Show |
| Commercial | No | Not available | Default Commercial |
| Unknown | No | Not available | Default Unknown |

*Note that the translator module's event type always overrides the interactive application's event type.

c) Atomic Command Mapping Logic

The event manager 504 maintains a separate state machine 512 for each event that it manages. When the event manager 504 receives atomic commands 514 from the translator module 502 it must associate the atomic command's program ID with the appropriate broadcast server event, and pass the atomic command to the appropriate state machine 512. This process is handling by the event manager's mapping logic 508.

The mapping logic 508 creates and maintains an event association table, which associates program ID's with broadcast server event ID's. Only scheduled atomic commands can cause new broadcast server events to be created. Consequently only they can add a new row to the event association table associating a program ID with the new broadcast server event's ID. The association is removed from the table when the event has traversed its state machine 512 and the state machine is destroyed.

Figure 10:
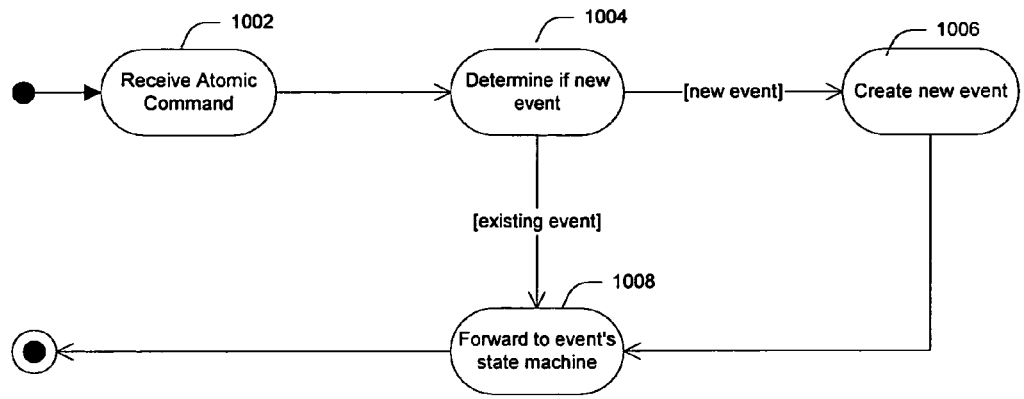
FIG. 10 is a flowchart of the event manager's mapping logic.

FIG. 10 illustrates the state behavior of one embodiment of the mapping logic 508. Table describes this figure.

TABLE 9

Event Manager State Machine

| State/Activity | Behavior |
|---|---|
| Receive atomic command (1002) | Atomic command is received from the translator module. Only event-related atomic commands can be processed by the event manager 504. Go to Determine if new event state (1004). |
| Determine if new event (1004) | If command is a schedule atomic command and program ID does not currently have a broadcast server event associated with it, then go to Create new event state (1006). Otherwise go to Forward to event's state machine (1008). |
| Create new event (1006) | Create new state machine for event and associate the program ID with this new event in the event association table. (See event manager state machine diagram, FIG. 11) Go to Forward to event's state machine (1008). |
| Forward to event's state machine (1008) | Forward the atomic command to the event's state machine. (See event manager state machine diagram, FIG. 11). |

When creating a new event state machine, the mapping logic 508 determines the event type, in accordance with the rules of Table 8, above.

For normal non-segmented interactive events there is a one-to-one mapping between scheduling system event and broadcast server event in the event association table. Two notable exceptions are discussed next.

d) Special Case Event Mapping

In general there is a one-to-one mapping between scheduling system events and broadcast server events. Two notable exceptions are discussed here.

(i) Default Events

On startup, the event manager 504 creates three broadcast server events (one for each default event type). These are the first three events in the event association table. As described above with respect to event types, the default events are chosen when an interactive application can not be found for the specified program ID. To support this the event association table allows many program ID's to map to the same default event ID. When the mapping logic 508 receives a schedule atomic command that has no interactive application associated with it, the mapping logic 508 associates that program ID with the default event that corresponds to the even type specified in the schedule atomic command. The mapping logic 508 does not pass along the schedule atomic command, since the default event is already scheduled.

(ii) Segmented Events

As previously noted, a single television show can be segmented into multiple parts. To the scheduling system 106 the show is a series of multiple events each with their own program ID. To the broadcast server the television show is a single event that is suspended and resumed for each segment. Consequently, the event association table bridges this gap by matching multiple program ID's to a single broadcast server event.

If the scheduling system 106 provides information about segmenting in its program ID, the event mapping logic 508 creates a new event state machine 512 for the first segment of the television show and automatically maps all other segments to the same event state machine 512.

Unfortunately, most scheduling systems do not provide this information. Thus, the automation server 108 determines if two different program ID's are associated with the same television show by determining whether both program ID's are mapped to the same interactive application in the interactive application database 112. When the mapping logic 508 determines that the new program ID is for another segment of a television show that is already listed in the event association table it:

1. Associates the new program ID with the pre-existing broadcast server event in the event association table, and
2. Does not pass along the schedule atomic command since the show has already been scheduled.

This is described in more detail below, in the Event State Machine and Segmentation sections.

e) Broadcast Server Primitive Commands

The event manager's state machines emit four broadcast server primitive commands—schedule, start, stop, and cancel—to control the broadcast server. These are analogous to the atomic commands of the same name. Schedule prepares an interactive application for broadcast and add it to the broadcast server's playlist. Start begins broadcast of the interactive application, and stop ceases broadcast of it. Cancel stops the interactive application (if not already stopped), removes the interactive application from memory, and deletes the associated event from the broadcast server's playlist.

In alternate embodiments, these particular commands may be extended to include other more complex behaviors, such as suspend indefinitely, suspend for selected time interval, resume immediately, resume after selected time interval, and so forth.

In addition, the content of the commands, that is, the type of interactivity that may be managed by the commands is variable, again dependent on the types of interactivity that is decided by the system designer. Thus, the commands may schedule or start triggers for previously broadcast interactivity, forms or other data, URLs, web pages, Java applets or other. hypermedia interactivity and the like.

8. Event State Machine

Atomic commands end their life in a particular event state machine 512. Each event state machine 512 is associated with a broadcast server event and controls all operations on that event. The atomic command mapping logic 508 determines which state machine 512 receives a particular atomic command (with a few exceptions noted below).

Figure 11:
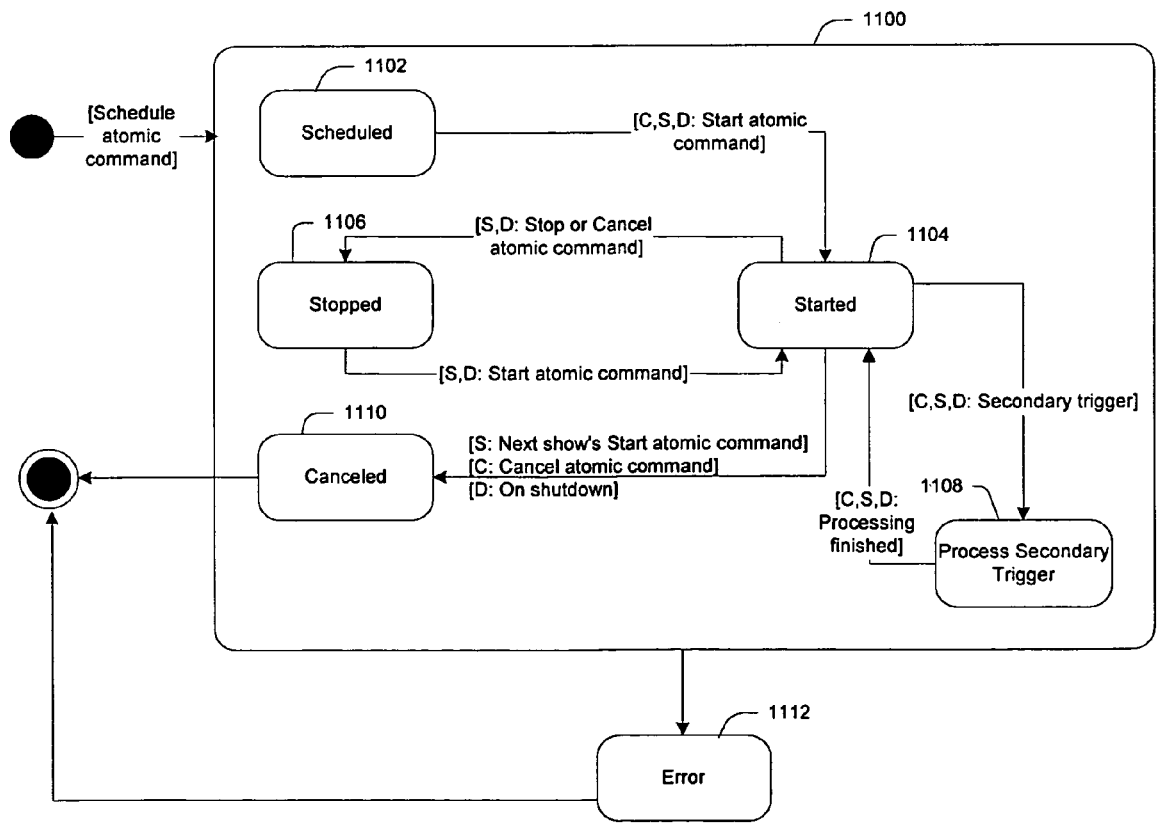
FIG. 11 is a state machine diagram of the event manager.

FIG. 11 illustrates the behavior of an event state machine 512, with details for commercials, television shows, and default event types. The event state machine traces the lifecycle of an event. In FIG. 11, state transitions are labeled to indicate to which types of events they apply, as follows:

Transition applicable to commercial events.

S: Transition applicable to television show events.

D: Transition applicable to default events.

In general an event will go through the following states:

Scheduled 1102: A schedule atomic command from the translator module 502 causes the event to be scheduled on the broadcast server. The state machine 512 emits the schedule broadcast primitive, which instructs the broadcast server 110 to prepare an interactive application for broadcast and add it to the broadcast server's playlist. After scheduling, the event will need to be started by a start atomic command.

Started 1104, Stopped 1106: A start command from the translator module 502 transitions the state machine to the started state 1104. The state machine emits a start broadcast primitive. After being started, the event can be started and stopped any number of times by start and stop atomic commands. The state machine transitions to stopped 1106 only for television shows and default events; the stopped 1106 state is not reached for commercial events.

In response to the start broadcast primitive, the broadcast server 110 can initiate the interactive application in various ways, including transmitting the interactive application if not previously transmitted, or if the application has been previously transmitted, transmitting a trigger to the interactive application to begin execution. Likewise, the broadcast server 110 may transmit other types of data, such as forms or content to the interactive application, or transmit a URL or the like, as previously described.

Process Secondary trigger 1108: Also after being started, an event can have zero or more secondary triggers occur. A secondary trigger is an action that occurs while the event is active (i.e. is scheduled on the broadcast server). An example would be a 5-minute warning to the end user before the event ends. These triggers are created by the scheduling system 106 and passed to the translator module as a control signal.

Canceled 1110: Finally, once the broadcast program associated with an event has ended, a cancel atomic command will be sent from the translator module 502. The state machine responds by emitting a cancel broadcast primitive to the broadcast server 110, which cancels the event. This state is reached differently for different events. For commercial events, this state is reached on when cancel atomic command is received from the translator module 502; for television show events, the state is reached when the next television's state command is received; finally for default events, the state is reached on Shutdown.

In order for the start of a broadcast server event (interactive application) to be accurately synchronized with its associated scheduling system broadcast program, some scheduling systems' support pre-roll. Pre-roll is the amount of time a device that the scheduling system 106 is controlling (like a VTR)

needs to complete an operation (like beginning to play a program). The scheduling system 106 can give the same kind of pre-roll warning to the automation server 108 giving it time to start an interactive application. Some scheduling systems support only one pre-roll value. If the automation server 108 response time is faster than that pre-roll value, then the automation server 108 introduces some additional delay in starting a broadcast server event. This fine-tuned timing is done in the event state machines by the system designer. The started, stopped, and canceled states can all introduce an amount of delay before actually starting, stopping, or canceling the broadcast server event.

While all broadcast server events share this same basic state machine, the event state machine is different for each event type. The details of these differences described below.

Secondary triggers are handled the same for all event types. Secondary triggers are a way of extending the automation server 108. Some scheduling systems 106 support more than the basic control signals (pre-load, pre-roll, on air, and off air). They can, for example, send a control signal 5 minutes before the end of a program to warn the device that the program is about to end. The automation server can use this signal to update the current interactive application to warn the viewer that it is about to end. This is just one example of how secondary triggers can be used.

a) Commercial Event Type

This is the simplest event state machine. A commercial event is never stopped or restarted, so it just goes from scheduled, to started (potentially with some secondary triggers), and finally to canceled. The following table summarizes the state, the atomic command causing it to enter that state, and the actions performed by that state.

TABLE 10

Event State Machine for Commercial Event Type

| State | Atomic Command | State Behaviors |
|---|---|---|
| Scheduled (1102) | Schedule command | Determine broadcast server event's parameters based on event type and interactive application location. Emit schedule broadcast primitive to schedule the event on the broadcast server. |
| Started (1104) | Start command | Pause to account for pre-roll, if any. Emit start primitive to start the event on the broadcast server. |
| Stopped (1106) | N/A | Never enter this state. |
| Canceled (1110) | Cancel command | Pause to account for pre-roll, if any. Emit cancel primitive to cancel the event on the broadcast server. | b) Show Event Type

The show event state machine 512 is very similar to the commercial event state machine, but also must account for segmenting (described in Event Types section).

Unlike a commercial event, the cancel command only stops a show event since the show may need to be resumed sometime in the future. Only when the next show's start atomic command is received can this show be canceled. The following table summarizes the state, the atomic command causing it to enter that state, and the actions performed by that state.

TABLE 11

Event State Machine for Show Event Type

| State | Atomic Command | State Behaviors |
|---|---|---|
| Scheduled (1102) | Schedule command | If it is the first segment of a show, then: Determine broadcast server event's parameters based on event type and interactive application location Schedule the event on the broadcast server. Else Do nothing. The event was already scheduled. |
| Started (1104) | Start command | Pause to account for pre-roll, if any. Start the event on the broadcast server. |
| Stopped (1106) | Stop or Cancel command | Pause to account for pre-roll, if any. Stop the event on the broadcast server. |
| Canceled (1110) | Next show's start command | Pause to account for pre-roll, if any. Cancel the event on the broadcast server. | c) Default Event Types

There are three different types for default events: default show event, default commercial event, and default unknown event. Default events are used when there is no associated interactive application for that program ID.

Unlike a commercial event, the cancel command only stops a default event since it may need to be restarted sometime in the future. It is only canceled when the automation server 108 is shutdown. The primary difference between normal events and default events is that there are cases where two sequential program ID's can refer to the same default events. In this case it is preferred to not stop the default event and restart it immediately. Instead, the default event is allowed to continue playing. For this to work the "Stopped" state does not actually stop the event until it is certain that the next start atomic command is not also for this default event. Regardless of the default event type, the following table summarizes the state, the atomic command causing it to enter that state, and the actions performed by that state.

TABLE 12

Event State Machine for Default Event Type

| State | Atomic Command | State's Behaviors |
|---|---|---|
| Scheduled (1102) | Schedule command | Occurs when the automation server 108 is started up. |
| Started (1104) | Start command | If not already started, then: Pause to account for pre-roll, if any. Start the event on the broadcast server. |
| Stopped (1106) | Stop or Cancel command | Defer stopping until next start atomic command On the next start atomic command: If start is for same default event Leave the default event playing Return to the Started state 1102 Else Pause to account for pre-roll, if any. Stop the event on the broadcast server. |
| Canceled (1110) | None | This only occurs when the automation server shutdown. |

9. Segmentation

Figure 12:
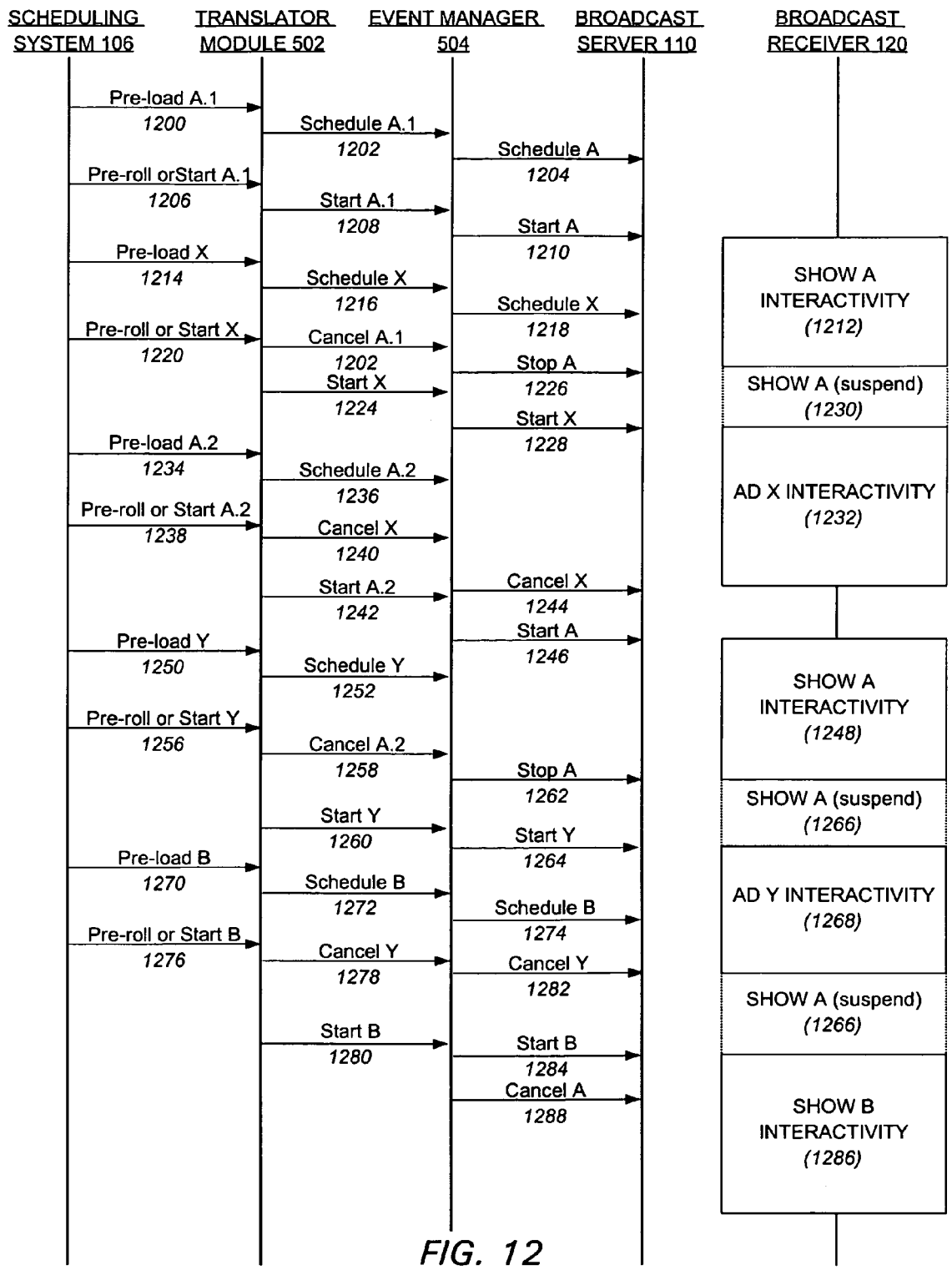
FIG. 12 is an event trace showing the segmentation of a broadcast program's interactivity with respect to commercials.

FIG. 12 illustrates how segmentation of television shows is handled to provide the viewer with a consistent experience, and maintain the appropriate interactive application during different segments of the television show, while likewise providing the appropriate interactive application during any commercials.

In FIG. 12 there is shown an event trace of the flow of control signals, atomic commands, and broadcast server commands from the scheduling system 106, (ideal) translator module 502, and event manager 504 when handling a segmented television show. The television show, Show A is broadcast in two segments, A.1, and A.2, each of which has a unique program ID. In between the segments is commercial Ad X. After segment A.2 there is commercial Ad Y followed by a new show, Show B. The problem solved by the present invention here is that of maintaining the same interactivity during both segments A.1 and A.2 (even though the segments have unique program IDs), while providing whatever specific or default interactivity accompanies Ad X and Ad Y. To achieve this result, the program IDs for both segments A.1 and A.2 must be mapped by the event manager 504 to the same broadcast event (show A) in the event association table. This is done using the various procedures described above. The sequence of control signals and atomic commands is then as follows:

Show Segment A.1

1200: First, the scheduling system 106 issues a pre-load A.1 signal.

1202: The translator module 502 in turn schedules segment A.1.

1204: The event manager 504 creates a new state machine 512 for this event (Show A), stores a mapping for this program ID and state machine in the event association table. The Show A state machine instructs the broadcast server 110 to schedule the appropriate interactive application for broadcast along with Show A.

1206: The scheduling system 106 then issues either pre-roll signal or a start signal for A.1.

1208: The translator module 502 in turn starts the segment A.1, potentially after some amount of delay determined by the amount pre-roll and the amount of time it takes the event manager 504 and broadcast server 110 to start the broadcast server event.

1210: The event manager Show A state machine correspondingly instructs the broadcast server to start the interactive application for Show A.

1212: Show A's interactive application is executed by the broadcast receiver 120 and appears on the display device, e.g., television set, coupled with the broadcast receiver 120.

If the scheduling system 106 issued a pre-roll first, then the translator module 502 will ignore a subsequent start signal from the scheduling system 106 since the show A.1 is already started.

Ad X

1214: After some time, the scheduling system 106 issues a pre-load signal for Ad X.

1216: The translator module 502 then issues schedule Ad X atomic command.

1218: The event manager issues a schedule command to the broadcast server 110 to schedule the interactive application (including default) for Ad X.

1220: The scheduling system 106 then issues a pre-roll or start Ad signal.

1222, 1224: Since the translator module 502 does not know that there is another segment to show A, it then transmits a cancel command for segment A.1, and then a start Ad X command. (If the scheduling system 106 sends a stop A.1, it will come after the pre-load and the pre-roll for Ad X, and for this reason it is ignored.)

1226, 1228: Normally, the event manager 504 would respond by canceling segment A.1. However, the event manager 504 temporarily ignores the cancel command, and instead issues a stop A.1 command to stop the interactive application for Show A, and then a start Ad X command, which begins execution of Ad X's interactive application.

1230, 1232: When these commands are received by the broadcast receiver, the receiver suspends execution of the interactive application for Show A, but does not terminate it, and begins execution of Ad X's interactive application (or the default application). Suspending the interactive application preserves whatever state information it had, such as points in a game, or the particular form that the viewer was viewing, and the like. Suspending has the further effect, for example, of removing Show A's interactive application from the display on the viewer's television set, so that the Show A interactive application is not displayed when Ad X is on screen, and Ad X's interactivity proceeds appropriately.

The event manager 504 defers the translator module's cancel command until it can determine that there is no other segment in Show A, which it does not know at this point in time. This will happen, subsequently, when Show B is started, as shown below.

Show Segment A.2

1234: As Ad X is about to end, scheduling system 106 issues pre-load A.2 signal.

1236: The translator module 502 issues a schedule A.2 command.

At this point, the mapping logic 508 of the event manager 504 determines that the program ID for this event (segment A.2) correlates to the same interactive application as the program ID of segment A.1. Accordingly, the mapping logic 508 routes all commands for segment A.2 (according to their program ID) to the event state machine for Show A. Since the interactive application for this segment of Show A is already loaded at the broadcast receiver, there is no need to have the broadcast server pre-load it now. Thus, the event manager does not issue another schedule command.

1238: The scheduling system 106 then issues either a pre-roll A.2 or start A.2 signal.

1240, 1242: The translator module 502 sends a cancel command for Ad X and a start command for segment A.2.

1244, 1246: The event manager 504 first instructs the broadcast server to cancel the interactivity for Ad X and then routes the start command to the Show A state machine which instructs the broadcast server to start the interactive application associated with show A. Because the interactive application for Show A was only suspended previously, it now begins operating again (1248), with whatever state it had was prior to Ad X starting.

Thus, if Show A were a game show and its interactive application as a game application, then suspending the application for Ad X would have saved the viewer's point total (and other state) in the game, which is then restored when segment A.2 is broadcast and the application restarted.

Ad Y

1250: At some later point, the scheduling system 106 issues a pre-load Ad Y signal.

1252: The translator module 502 sends schedule Y command to the event manager 504.

1254: The event manager 504 schedules the interactivity for Ad Y on the broadcast server.

1256: The scheduling system 106 then issues a pre-roll Ad Y or start Ad Y signal.

1258, 1260: The translator module 502 sends a cancel command for segment A.2 and a start command for Ad Y.

1262, 1264: Again, the event manager 504 defers the cancel command, and instead instructs the broadcast server to stop the interactivity for show A and start the interactivity, if any (including default) for Ad Y. Show A's interactive application is suspended (1266), and the interactivity for Ad Y executes (1268).

Again, the state machine for Show A has deferred cancellation of segment A.2's interactive application since it does not yet know if there is another segment of show A.

Show B

1270: As Ad Y is about to end, the scheduling system 106 issues a pre-load Show B signal.

1272: The translator module 502 schedules Show B.

1274: The mapping logic 508 of the event manager now determines that the program ID for Show B is different from Show A, and hence there are no further segments for Show A. A new state machine for Show B is instantiated. The event manager 504 then issues a schedule Show B to the broadcast server to schedule the interactivity for Show B. The event manager does not yet cancel the interactivity for Show A since Show B has not yet started.

1276: Then scheduling system 106 then issues either a pre-roll or a start Show B.

1278, 1280: The translator module 502 issues atomic commands to cancel Ad Y, start Show B.

1282, 1284: The event manager 504 first cancels Ad Y and then routes the start command to the new Show B state machine.

1288: When the start Show B command appears, the event manager 504 can safely cancel the interactivity for Show A, segment A.2 because it is clear that a new show is beginning. This cancel command does not come from the translator module 502 directly, but is synthesized by the event manager's Show A state machine based on the start command for Show B. Since it is possible for Show B to be scheduled hours in advance of its broadcast, Show A's interactivity should not be cancelled until Show B actually starts. Also note that the cancellation can not occur when scheduling event B because of the potential for back-to-back shows and because Show B could be scheduled hours in advance of its starting time.

In some cases, there is no intervening commercial (e.g., Ad Y) between two television shows (e.g., Show A and Show B). That is, the two shows can be back-to-back (i.e. Show B can start right after Show A). In this case, Cancel Show A 1288 occurs before Start Show B 1284.

In an alternative embodiment, the event manager 504 can start one interactive application before canceling another. For example this is desirable if canceling an interactive application takes more time than stopping then, it is an optimization to start the interactive application for Show B before canceling the interactive application for show A in cases where the two shows are not back-to-back. In general the, an alternative embodiment is to stop the previous interactive application, and start the next interactive application, and then cancel the previous one.

In summary then, the present invention provides various methods and means for controlling the behavior of interactive content in synchrony with the broadcast and display of broadcast programs, including television shows and commercials, and the like. The principles of the present invention, including using native control signals to determine the identity and state of broadcast programs and then to manage the states of interactivity associated with the broadcast programs can be implemented in a variety of different manners with numerous variations. Some of these variations within the scope of the invention are as follows:

The automation server 108 is described as using the dual state machines of the translator module 502 and the event manager 504. Though beneficial, it is possible that other embodiments of the invention may implement the automation server 108 or its functionality without state machines, for example using programmed scripts for each type of control signal, or other procedural mechanisms.

The set of ideal control signals and states in the translator module 502, atomic commands output to the event manager 504, or the commands produced to control a broadcast server-like device may all be varied to cover more or fewer signals and commands. Likewise the specific actions in each of states may be varied. For example, in addition to commands to stop or cancel, a specific resume or resume with delay command may be used for more complex control. A save command may instruct the broadcast receiver 120 to save data generated in the interactivity for future retrieval. This command could be generated, for example, in response to error conditions, channel changes, or other events in order to save data that the user or the interactivity has created. A send or upload command may instruct the broadcast receiver to transmit data that has been created/stored back to a collection mechanism, for example to complete a purchase of a product via an interactive purchasing application.

The types of interactivity that can be controlled by the automation server 108 and the present invention may be varied, and are not limited to existing interactive applications. It is anticipated that interactivity such as web pages, or combinations of web pages and interactive applications may be controlled using the principles of the present invention.

The timing of when commands to a broadcast server or similar device may be varied, depending on the bandwidth, connection speed for transmitting the data, and execution response time of the broadcast receiver relative to how quickly it can display a television image. Thus, the commands can be sent before the underlying broadcast event occurs, at the exact time thereof, just after, or substantially before. The timing of the commands can be optimized to take advantage of what information is known at the earliest available time.

The means by which the control signals are provided to the automation server or its equivalents may varied. These include as binary data over a serial port, LAN, or telecommunications interface to the scheduling system, or a binary data encoded into an analog or digital video signal.

Accordingly, the present invention is understood to be limited by the scope of the subsequent claims, and not inherently limited by the details of the preferred embodiments disclosed above.

We claim:

1. A computer implemented method of controlling the broadcast and reception of an interactive application, comprising:

receiving control signals that control the broadcast of broadcast programs;

determining from the control signals an interactive application associated with one of the broadcast programs; and generating from the control signals, commands to maintain execution and termination of the interactive application in synchrony with either the display or the broadcast of the broadcast program, wherein a scheduling system provides the control signals, the control signals include data identifying each broadcast program and its duration, the method further comprising:

generating commands to selectively schedule, start, stop, and cancel interactive applications associated with the broadcast programs using the identification data and the duration data from the control signals.

2. The method of claim 1, wherein generating the commands further comprises:

generating commands to maintain synchronous display of the interactive application with display of the broadcast program on a broadcast receiver.

3. The method of claim 1, wherein generating the commands further comprises:
generating commands to terminate display of the interactive application in synchrony with termination of the display of the broadcast program.

4. The method of claim 1, wherein generating the commands further comprises:
determining from the control signals a state of the broadcast program;
responsive to the state of the broadcast program, determining a state of the interactive application; and
generating at least one command appropriate to the state of the interactive application.

5. The computer implemented method of claim 1, wherein generating the commands further comprises:
determining from the control signals that a commercial is being broadcast;
responsive to determining that a commercial is being broadcast, generating a command to suspend execution of the interactive application associated with the television show; and
responsive to determining that the commercial is no longer being broadcast, generating a command to resume execution of the interactive application associated with the television program.

6. The computer implemented method of claim 1, wherein the one of the broadcast programs is a first television show, and wherein generating the commands further comprises:
determining from the control signals that a commercial is being broadcast;
receiving a control signal to terminate the television show;
responsive to determining that a commercial is being broadcast, generating a command to suspend execution of the interactive application associated with the first television show; and
responsive to determining that the first television show is being broadcast after the commercial, generating a command to restart execution of the interactive application associated with the first television show.

7. The computer implemented method of claim 1, wherein the one of the broadcast programs is a first television show, and wherein generating the commands further comprises:
determining from the control signals that a commercial being broadcast;
receiving a control signal to terminate the television show;
responsive to determining that a commercial is being broadcast, generating a command to suspend execution of a first interactive application associated with the first television show; and
responsive to determining that the first television show is being broadcast after all the commercials in the commercial break, generating a command to restart execution of the first interactive application; and
responsive to determining that a second television show is being broadcast, generating commands to terminate the first interactive application and to begin execution of a second interactive application associated with the second television show.

8. The computer implemented method of claim 1, wherein receiving the control signals comprises receiving the control signals from a scheduling system by emulating a broadcast source device that is controlled by the scheduling system.

9. The method of claim 1, wherein each control signal is associated with a broadcast program, and wherein receiving the control signals comprises:
translating the controls signals into a set of commands to an interactive application server for selectively instructing the server to schedule, start, stop, and cancel interactive applications for the broadcast programs associated with the control signals.

10. The computer implemented method of claim 1, wherein the controls signals are generated by a scheduling system in response to a playlist defining a series of broadcast programs including program identifiers and information describing when the broadcast programs are to be broadcast.

11. The method of claim 1, wherein the controls signals are pre-recorded and stored in association with the broadcast programs that are controlled by the control signals.

12. The method of claim 1, further comprising:
receiving a prepare control signal to prepare the broadcast of a selected broadcast program;
determining an interactive application associated with the selected broadcast program;
generating a command to schedule execution of the determined interactive application.

13. The method of claim 1, further comprising:
receiving a start control signal to prepare the broadcast of a selected broadcast program;
determining an interactive application associated with the selected broadcast program;
generating a command to start transmission of the determined interactive application.

14. The method of claim 1, further comprising:
determining a type of broadcast program for a control signal.

15. The method of claim 14, further comprising:
determining a type for an interactive application as a function of the type of the broadcast program.

16. The method of claim 1, further comprising:
determining a type of broadcast program for a control signal to be either a television show, a commercial, or unknown; and
determining a type of interactive application appropriate to the type of the broadcast program.

17. The method of claim 1, further comprising:
maintaining for each broadcast program which is associated with an interactive application a first state machine that responds to the controls signals to transition through states associated with the broadcast program, and that generates commands in selected states related to desired behavior for the interactive application for the state of the broadcast program; and
maintaining for the interactive application associated with the broadcast program a state machine that responds to the commands from the broadcast program's state machine that transitions through states associated with the interactive application, and which selectively generates the commands to maintain the synchronous execution of the interactive application with the broadcast program.

18. A system to control the broadcast and reception of an interactive application, the system comprising:
a receiver to receive control signals that control the broadcast of broadcast programs;
an interactive application detector to determine, from the control signals, an interactive application associated with one of the broadcast programs; and
a commands generator to generate, from the control signals, commands to maintain execution and termination of the interactive application in synchrony with either the display or the broadcast of the broadcast program;

a scheduling system to:
provide the control signals including data identifying each broadcast program and its duration, and
generate commands to selectively schedule, start, stop, and cancel interactive applications associated with the broadcast programs using the identification data and the duration data from the control signals.

19. The system of claim 18, the system comprising:
for each broadcast program which is associated with an interactive application, a first state machine to:
respond to the controls signals,
transition through states associated with the broadcast program, and
generate commands in selected states related to desired behavior for the interactive application for the state of the broadcast program; and
a second state machine, maintained for the interactive application associated with the broadcast program, the second state machine to:
respond to the commands from the first state machine,
transition through states associated with the interactive application, and
selectively generate the commands to maintain the synchronous execution of the interactive application with the broadcast program.

20. A memory device having instruction data to cause a machine to:
receive control signals that control the broadcast of broadcast programs;
determine from the control signals an interactive application associated with one of the broadcast programs; and
generate from the control signals, commands to maintain execution and termination of the interactive application in synchrony with either the display or the broadcast of the broadcast program, wherein a scheduling system provides the control signals, the control signals include data identifying each broadcast program and its duration, the memory device further to:
generate commands to selectively schedule, start, stop, and cancel interactive applications associated with the broadcast programs using the identification data and the duration data from the control signals.

\* \* \* \* \*